(12) United States Patent
Coorey et al.

(10) Patent No.: US 11,216,493 B2
(45) Date of Patent: Jan. 4, 2022

(54) SYSTEM AND METHOD FOR AUTOMATICALLY GENERATING GEOGRAPHIC SPECIFIC DATA

(71) Applicant: GeoInt-SafeNet Pty Ltd, Braddon (AU)

(72) Inventors: Robert Coorey, Carwoola (AU); James Brown, Franklin (AU); Gregory Keith, Turner (AU)

(73) Assignee: GeoInt-SafeNet Pty Ltd

( * ) Notice: Subject to any disclaimer, the term of this patent is extended or adjusted under 35 U.S.C. 154(b) by 109 days.

(21) Appl. No.: 16/628,179

(22) PCT Filed: Jul. 4, 2018

(86) PCT No.: PCT/AU2018/050692
§ 371 (c)(1),
(2) Date: Jan. 2, 2020

(87) PCT Pub. No.: WO2019/006505
PCT Pub. Date: Jan. 10, 2019

(65) Prior Publication Data
US 2021/0149927 A1    May 20, 2021

(30) Foreign Application Priority Data
Jul. 4, 2017  (AU) ................................ 2017902603

(51) Int. Cl.
| G06F 16/00 | (2019.01) |
| G06F 16/29 | (2019.01) |
| G06F 16/95 | (2019.01) |
| G06F 16/387 | (2019.01) |
| G06Q 50/14 | (2012.01) |

(52) U.S. Cl.
CPC ............ *G06F 16/29* (2019.01); *G06F 16/387* (2019.01); *G06F 16/95* (2019.01); *G06Q 50/14* (2013.01)

(58) Field of Classification Search
CPC ....................................................... G06F 16/29
See application file for complete search history.

(56) References Cited

U.S. PATENT DOCUMENTS

| 8,903,870 B2 | 12/2014 | Turk et al. |
| 9,618,343 B2 | 4/2017 | Kahn et al. |

(Continued)

FOREIGN PATENT DOCUMENTS

| AU | 2003100741 A4 | 11/2003 |
| AU | 2014224103 A1 | 3/2015 |

(Continued)

OTHER PUBLICATIONS

International Search Report for corresponding Application No. PCT/AU2018/050692 dated Sep. 17, 2018, pp. 1-4.

(Continued)

*Primary Examiner* — Ajith Jacob
(74) *Attorney, Agent, or Firm* — The Belles Group, P.C.

(57) ABSTRACT

A system (1) for automatically generating geographic specific data. System (1) includes a first database (5) for storing a first set of records, wherein each record includes location data, content data and timestamp data. A second database (15) stores a second set of data records, wherein each record includes location data, content data and timestamp data. A third database (25) stores a third set of records, wherein each record is indicative of a respective geographic location. A communications interface (31) receives unstructured data (32) from data sources (33) and structured data (34) from data sources (35). System (1) includes a computing platform (50) which is responsive to the unstructured data (32) for selectively updating the first set of records, responsive to the structured data (34) for selectively updating the second set of records, and responsive to the first and second set of records for generating geographic specific data in the form of a risk rating for each location.

17 Claims, 11 Drawing Sheets

(56) References Cited

U.S. PATENT DOCUMENTS

| | | | |
|---|---|---|---|
| 2009/0077100 A1* | 3/2009 | Hancock | H04L 67/02 |
| 2010/0324958 A1 | 12/2010 | Stiles et al. | |
| 2013/0012237 A1* | 1/2013 | Hamynen | H04N 21/4722 |
| | | | 455/456.3 |
| 2014/0118142 A1 | 5/2014 | Narayanas-Wami | |
| 2017/0345112 A1 | 11/2017 | Locke et al. | |

FOREIGN PATENT DOCUMENTS

| | | |
|---|---|---|
| AU | 2014274504 A1 | 6/2015 |
| WO | WO2013/188466 A2 | 12/2013 |
| WO | WO2014066431 A1 | 5/2014 |
| WO | WO2015/162606 A1 | 10/2015 |

OTHER PUBLICATIONS

AFAR Application, retrieved Mar. 10, 2020, (2015), p. 1.
AFAR Application, retrieved Mar. 10, 2020, (2016), p. 1.
Cajun Coast Application, retrieved Mar. 10, 2020, (2014), pp. 1-6.
City Mapper Application, retrieved Mar. 10, 2020, (2018), pp. 1-5.
Emergency AUS Application, http://emergencyaus.info/, retrieved Mar. 10, 2020, (2014), pp. 1-2.
Emergency AUS Application, http://emergencyaus.info/, retrieved Mar. 10, 2020, (2016), p. 1.
Foursquare Application, retrieved Mar. 10, 2020, (2015), p. 1.
Foursquare Application, retrieved Mar. 10, 2020, (2017), p. 1.
Gogobot Application, retrieved Mar. 10, 2020, (2014), p. 1.
Gogobot Application, retrieved Mar. 10, 2020, (2015), pp. 1-5.
Hostelworld Application, retrieved Mar. 10, 2020, (2019), pp. 1-6.
SmartTraveller Application, retrieved Mar. 10, 2020, (2017), pp. 1-5.
TripAdvisor Application, retrieved Mar. 10, 2020, (2015), p. 1.
TripAdvisor Application, retrieved Mar. 10, 2020, (2019), p. 1.
Twist Application, retrieved Mar. 10, 2020, (2012), pp. 1-2.
WorldMate Application, retrieved Mar. 10, 2020, (2013), p. 1.
WorldMate Application, retrieved Mar. 10, 2020, (2016), pp. 1-6.

* cited by examiner

US 11,216,493 B2

SYSTEM AND METHOD FOR AUTOMATICALLY GENERATING GEOGRAPHIC SPECIFIC DATA

CROSS-REFERENCE TO RELATED PATENT APPLICATIONS

The present application is a U.S. national stage application under 35 U.S.C. § 371 of PCT Application No. PCT/AU2018/050692, filed Jul. 4, 2018, which claims priority to Australian Patent Application No. 2017902603, filed Jul. 4, 2017. The disclosures of the aforementioned priority applications are incorporated herein by reference in their entireties.

FIELD OF THE INVENTION

The present invention relates to a system and a method for automatically generating geographic specific data, and more particularly to a system and a method for communicating that data to a plurality of remote users having respective communications devices.

Embodiments of the invention have been particularly developed for generating geographic specific data such as risk ratings and other time critical content and for communicating those risk ratings or other content to a plurality of remote users having respective communications devices. In particular, these embodiments are able to be used to assist individual travellers to unfamiliar countries and geographic regions by making available to those travellers safety information such as risk ratings. The embodiments have also been developed to gather and store the safety information to facilitate the derivation of the risk ratings and for the communication of those risk ratings to travellers. These embodiments will be described herein with particular reference to those specific applications. However, it will be appreciated that the invention is not limited to such fields of use, and is also applicable to groups of travellers and organisations responsible for those travellers.

BACKGROUND

Any discussion of the background art throughout the specification should in no way be considered as an admission that such art is widely known or forms part of common general knowledge in the field.

With the growing prevalence of foreign travel by individuals and groups for leisure, business and governmental purposes, there has arisen over the last decade or so a strong desire for access to better information about the travel destinations, particularly when planning for such travel. In parallel, the increasing ubiquitousness of internet access has allowed a number of prior art systems to arise from which travellers, and those with an interest in those travellers, to gain information about the travel destinations and the location of the travellers during the planned travel.

There are a number of prior art systems configured for use by individual travellers. One example of such systems includes the Smartraveller App supplied by the Australian Department of Foreign Affairs. This App allows individual travellers to gain access to relatively up-to-date Australian Federal Government approved travel advice and tips for given countries, as well as destination updates to help the potential travellers make informed decisions before travelling abroad. A further example system is provided by the Gogobot App, which provides travellers with weather information based on the traveller's location, and allows the travellers to view, while travelling, suggested local attractions and the like. Other prior art systems include the Foursquare App, the TripAdvisor App, the Cajun Coast App, the Twist App, the AFAR App, the HostelWorld App, the WorldMate App, and the CityMapper App, amongst others. These systems typically offer a combination of similar or overlapping functionalities for individual travellers, although each with its own unique emphasis.

In addition to these presently publicly accessible systems, there are other potential systems illustrated by the disclosure in, for example, Australian patent application AU2003100741. This system proposes risk reduction for travellers through sharing information with other travellers to better inform the collective group. This occurs using two-way 'push' and 'pull' safety and security information via a controlling intermediary (in this case e-Travel Safe). Further examples of traveller information sharing systems are provided in Australian patent applications 2014224103 and 2014224103.

A further example prior art system is provided by the disclosure in US patent application 2010/0324958 which provides an asset, personnel, and travel information accumulation, analysis, and reporting system. A further example system of this general nature is illustrated in WO2013/188466, where a travel advisory generation system enables generation of electronic travel notifications based upon one or more selected parameters such as origin, destination, travel dates and travel provider. Examples of the notifications include events such as labour strikes, mechanical failure, new fees/rules for travel, severe weather events, security threats and high numbers of travellers at a given location.

Other prior art systems are focussed also on providing travel bookings and advice to travellers, and to assisting with travel bookings and changes to bookings. Such systems are illustrated by the disclosure in Australian patent application 2014274504, PCT patent applications PCT/IL2015/050414 and PCT/US2013/066247, and U.S. patent application Ser. No. 14/105,095.

A further prior art system is disclosed in U.S. Ser. No. 13/337,005, where a system for managing risk in employee travel is described. This system involves tracking the location of travellers during their travel and notifying the travellers of events that may pose a risk to the proposed travel.

While not related specifically to travellers, there is available a further system provided by Emergency AUS (http://emergencyaus.info/) for providing the public with a single map-based interface that users are able to navigate to locate emergency events such as automotive accidents and extreme weather events. The system draws data from a number of remote data sources containing emergency information and presents this centrally for users to view. There is also the ability for users to submit observations and/or other information about the events.

Even for those of the above systems that issue alerts or other notifications to users, those are typically concerned with specific events rather than the overall risk for a given location. Moreover, the location and nature of the events are obtained from government or other authorised agencies, which invariably involves a delay due to the level of authorisation and verification that is required before information is able to be published by those agencies. The one prior art system which does provide some indication of overall risk, U.S. patent application Ser. No. 13/337,005, is primarily concerned with allowing organisations to better monitor the location of the personnel in the field and the anticipated risks being faced by those personnel. Moreover, the construction of the risk ratings is manually intensive, and necessarily subjective.

Notwithstanding the existence of these prior art systems, in the current globalised and yet uncertain international environment, safety of travellers, particularly in overseas locations, remains a prominent concern for businesses, non-government organisations, insurance companies, corporate executives, governments and individuals. Accordingly, there is a need in the art for an improved system and method for generating geographic specific risk ratings.

SUMMARY OF THE INVENTION

It is an object of the preferred embodiments of the present invention to overcome or ameliorate at least one of the disadvantages of the prior art, or to provide a useful alternative.

According to a first aspect of the invention there is provided a method for automatically updating a first set of data records and a second set of data records respectively stored in a first database and a second database, where each data record includes content data and location data indicative of a geographic location related to the content data, the method including the steps of:
  obtaining unstructured data;
  obtaining structured data;
  being responsive to the unstructured data for generating further content data and further corresponding location data and updating the first set of data records with that further data; and
  being responsive to the structured data for selectively updating the second set of data records.

In an embodiment, the further location data is metadata and the method includes the step of automatically deriving the metadata from the further content data.

In an embodiment, the unstructured data includes text data and the method includes generating content data that includes at least some of the text data.

In an embodiment, the method includes the step of being responsive to the structured data for generating further content data and further corresponding location data and updating the second set of data records with that further data.

In an embodiment, the method includes the step of being responsive to a first trigger signal for obtaining the unstructured data.

In an embodiment, the method includes the step of being responsive to a second trigger signal for obtaining the structured data.

In an embodiment, the first trigger signal issues more frequently than the second trigger signal.

In an embodiment, the first trigger signal issues periodically.

In an embodiment, the first trigger signal issues intermittently.

In an embodiment, the first trigger signal issues within a predetermined time interval since the issue of the immediately preceding first trigger signal.

In an embodiment, the predetermined time interval is one of: one day; one hour; half an hour; one quarter of an hour; ten minutes; and five minutes.

In an embodiment, there is a plurality of remote users each having respective electronic devices and the method includes the further step of being responsive to user location data respectively received from the remote electronic devices for generating respective fourth data derived from the first and the second set of data records.

In an embodiment, the method includes the step of communicating the fourth data to the respective electronic devices.

In an embodiment, each electronic device includes memory for selectively storing local data derived from the fourth data received by that device, and the step of generating the fourth data includes generating intermediate data derived from the first and the second set of data records and generating the fourth data that will allow synchronisation of the local data with the intermediate data.

In an embodiment, the method includes the step of being responsive to user identification data respectively received from the plurality of remote electronic devices for generating the respective fourth data derived from the first and the second set of data records.

In an embodiment, the step of being responsive to the user identification data includes generating the fourth data for at least one user to include at least part of the fourth data for another of the users.

According to a second aspect of the invention there is provided a system for automatically updating a first set of data records and a second set of data records respectively stored in a first database and a second database, where each data record includes content data and location data indicative of a geographic location related to the content data, the system including a computing platform for:
  obtaining unstructured data;
  obtaining structured data;
  being responsive to the unstructured data for generating further content data and further corresponding location data and updating the first set of data records with that further data; and
  being responsive to the structured data for selectively updating the second set of data records.

According to a third aspect of the invention there is provided a method for automatically generating geographic specific risk ratings, the method including the steps of:
  storing a first set of data records in a first database, wherein each data record in the first set includes location data and content data;
  storing a second set of data records in a second database, wherein each data record in the second set includes location data and content data;
  storing a third set of data records in a third data base, wherein each data record in the third set is indicative of a geographic location;
  obtaining unstructured data;
  obtaining structured data;
  being responsive to the unstructured data for selectively updating the first set of data records;
  being responsive to the structured data for selectively updating the second set of data records; and
  being responsive to the first and second sets of data records for generating a risk rating for the geographic locations indicated in the third data records.

According to a fourth aspect of the invention there is provided a system for automatically generating geographic specific risk ratings, the system including a computing platform for:
  storing a first set of data records in a first database, wherein each data record in the first set includes location data and content data;
  storing a second set of data records in a second database, wherein each data record in the second set includes location data and content data;

storing a third set of data records in a third data base, wherein each data record in the third set is indicative of a geographic location;
obtaining unstructured data;
obtaining structured data;
being responsive to the unstructured data for selectively updating the first set of data records;
being responsive to the structured data for selectively updating the second set of data records; and
being responsive to the first and second sets of data records for generating a risk rating for the geographic locations indicated in the third data records.

According to a fifth aspect of the invention there is provided a method for communicating with a plurality of remote users having respective communications devices, the method including the steps of:
storing a first set of data records in a first database, wherein each data record in the first set includes location data and content data;
storing a second set of data records in a second database, wherein each data record in the second set includes location data and content data;
storing a third set of data records in a third data base, wherein each data record in the third set is indicative of a geographic location;
obtaining unstructured data;
obtaining structured data;
being responsive to the unstructured data for selectively updating the first set of data records;
being responsive to the structured data for selectively updating the second set of data records;
being responsive to the first and the second set of data records for generating a risk rating for the geographic locations indicated in the third data records;
receiving from the communications devices user data including at least user location data;
being responsive to the user data and the third data records for selectively generating for each device respective fourth data that is derived from one or more of: selected first data records; selected second data records; and selected risk ratings; and
communicating the fourth data to the respective communication devices.

In an embodiment, the user data includes user identification data and the step of generating the fourth data is responsive to the user identification data.

In an embodiment, the fourth data includes rule data and content data and the step of generating the fourth data includes identifying or creating the rule data and the content data.

In an embodiment, each communications device includes a processor, a user interface controlled by the processor and a communications interface for providing the user data and for receiving the fourth data, and wherein the method includes the further step of the processor being responsive to the rule data for controlling the interface to display the content data.

According to a sixth aspect of the invention there is provided a system for communicating with a plurality of remote users having respective communications devices, the system including:
a first database for storing a first set of data records, wherein each data record in the first set includes location data and content data;
a second database for storing a second set of data records, wherein each data record in the second set includes location data and content data;
a third data base for storing a third set of data records, wherein each data record in the third set is indicative of a respective geographic location;
a first communications interface for receiving unstructured data and structured data and for receiving from the communications devices user data including user location data and user identification data: and
a computing platform for:
being responsive to the unstructured data for selectively updating the first set of data records;
being responsive to the structured data for selectively updating the second data records;
being responsive to the first set and the second set of data records for generating a risk rating for each geographic location indicated in the third set of data records;
being responsive to the user data and the third set of data records for selectively generating for each device respective fourth data that is derived from one or more of: selected data records from the first set; selected data records from the second set; and selected risk ratings; and
communicating the fourth data to the respective communication devices.

In an embodiment; each communications device includes a second communications interface for providing the user data to the first communications interface and for receiving the fourth data from the first communications interface.

In an embodiment, the fourth data includes content data and rule data, and each communications device includes a user interface and a processor that is responsive to the rule data for selectively displaying the content data to the user via the user interface.

In an embodiment, each communications device includes memory for storing the content data and the rule data.

According to a seventh aspect of the invention there is provided a method for automatically generating geographically specific data, the method including the steps of:
storing in a first database a first set of data records, wherein each data record in the first set includes location data and content data;
storing in a second database a second set of data records, wherein each data record in the second set includes location data and content data;
storing in a third data base a third set of data records; wherein each third data record is indicative of a geographic location;
using an interface for communicating with a plurality of remote data sources; and
providing a computing platform that is responsive to predetermined rules for:
controlling the interface to access at least one of the remote data sources to gather unstructured data;
controlling the interface to access at least one of the remote data sources to gather structured data;
being responsive to the unstructured data for selectively updating the first set of data records;
being responsive to the structured data for selectively updating the second set of data records; and
being responsive to the first and second sets of data records for generating a risk rating for each geographic location indicated by the third data records.

In an embodiment, the step of generating the risk rating for each geographic location indicated by the third data records includes:

being responsive to the third set of data records and the location data in the first set of records for selectively allocating a subset of the first set of records to the geographic locations;

being responsive to the content data in the subset for allocating each record in that subset against one or more categories in a set of categories; and generating the risk rating in response to the number of data records in the subset that are allocated against each category.

In an embodiment, the step of being responsive to the number of data records in the subset that are allocated against each category includes being responsive to the proportion of the data records that are allocated against each category.

According to an eighth aspect of the invention there is provided a system for automatically generating geographic specific data, the system including:

a first database for storing a first set of data records, wherein each data record in the first set includes location data and content data;

a second database for storing a second set of data records, wherein each data record in the second set includes location data and content data;

a third data base for storing a third set of data records, wherein each third data record is indicative of a geographic location;

an interface for communicating with a plurality of remote data sources; and a computing platform that is responsive to predetermined rules for:

controlling the interface to access at least one of the remote data sources to gather unstructured data;

controlling the interface to access at least one of the remote data sources to gather structured data;

being responsive to the unstructured data for selectively updating the first set of data records;

being responsive to the structured data for selectively updating the second set of data records; and being responsive to the first and second set of data records for generating a risk rating for each geographic location indicated in the third data records.

According to a ninth aspect of the invention there is provided a communications device for a user, the device being able to establish a communications session with a remote computing platform that selectively generates fourth data for the device that is derived from risk ratings for at least one geographic location; the device including:

a communications interface for receiving the fourth data and for providing user data to the computing platform during the communications session;

memory for storing local data derived from the fourth data;

a processor for executing local computer code for selectively presenting the local data to the user.

In an embodiment, the processor executes the local computer code to enable the selective presentation of the local data to the user during the communications session.

In an embodiment, the processor executes the local computer code to enable the selective presentation of the local data to the user outside the communications session.

In an embodiment, the fourth data and the local data include content data and rule data, and the processor is responsive to the rule data in the local data for selectively presenting the content data to the user.

In an embodiment, the device includes a user interface, wherein the processor executes the local computer code for selectively displaying the local data on the user interface.

According to a tenth aspect of the invention there is provided a method for automatically generating geographic specific data, the method including the steps of:

storing a first set of data records in a first database, wherein each data record in the first set includes location data and content data;

storing a second set of data records in a second database, wherein each data record in the second set includes location data and content data;

storing a third set of data records in a third data base, wherein each data record in the third set is indicative of a geographic location;

obtaining unstructured data;

obtaining structured data;

being responsive to the unstructured data for selectively updating the first set of data records;

being responsive to the structured data for selectively updating the second set of data records; and being responsive to the first and second sets of data records for generating the geographic specific data for the geographic locations indicated in the third data records.

According to an eleventh aspect of the invention there is provided a system for automatically generating geographic specific data, the system including a computing platform for:

storing a first set of data records in a first database, wherein each data record in the first set includes location data and content data;

storing a second set of data records in a second database, wherein each data record in the second set includes location data and content data;

storing a third set of data records in a third data base, wherein each data record in the third set is indicative of a geographic location;

obtaining unstructured data;

obtaining structured data;

being responsive to the unstructured data for selectively updating the first set of data records;

being responsive to the structured data for selectively updating the second set of data records; and being responsive to the first and second sets of data records for generating the geographic specific data for the geographic locations indicated in the third data records.

One embodiment provides a computer program product for performing a method as described herein.

One embodiment provides a non-transitive carrier medium for carrying computer executable code that, when executed on a processor (that defines all or part of a processing arrangement), causes the processor to perform a method as described herein.

Reference throughout this specification to "one embodiment", "some embodiments" or "an embodiment" means that a particular feature, structure or characteristic described in connection with the embodiment is included in at least one embodiment of the present invention. Thus, appearances of the phrases "in one embodiment", "in some embodiments" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", and so on, to describe a common object, merely indicate that different instances of like objects are being referred to, and are not intended to imply that the objects so described must be in a given sequence, either temporally, spatially, in ranking or importance, or in any other manner.

In the claims below and the description herein, any one of the terms "comprising", "comprised of" or "which comprises" is an open term that means "including at least the elements/features that follow, but not excluding others". Thus, the term "comprising", or the like, when used in the claims, should not be interpreted as being limitative to the means or elements or steps listed thereafter. For example, the scope of the expression "a device comprising A and B" should not be limited to devices consisting only of elements A and B. Any one of the terms "including" or "which includes" or "that includes" as used herein is also an open term that also means "including at least the elements/ features that follow the term, but not excluding others". Thus, the term "including" is synonymous with and means "comprising".

As used herein, the term "exemplary" is used in the sense of providing examples, as opposed to indicating quality or pre-eminence. That is, an "exemplary embodiment" is an embodiment provided as an example, as opposed to necessarily being an embodiment of exemplary quality.

BRIEF DESCRIPTION OF THE DRAWINGS

Embodiments of the invention will now be described, by way of example only, with reference to the accompanying drawings in which.

DETAILED DESCRIPTION

Described herein are a system and method for communicating geographic specific data, as exemplified by geographic specific risk ratings, to a plurality of remote users having respective communications devices.

Figure 1:
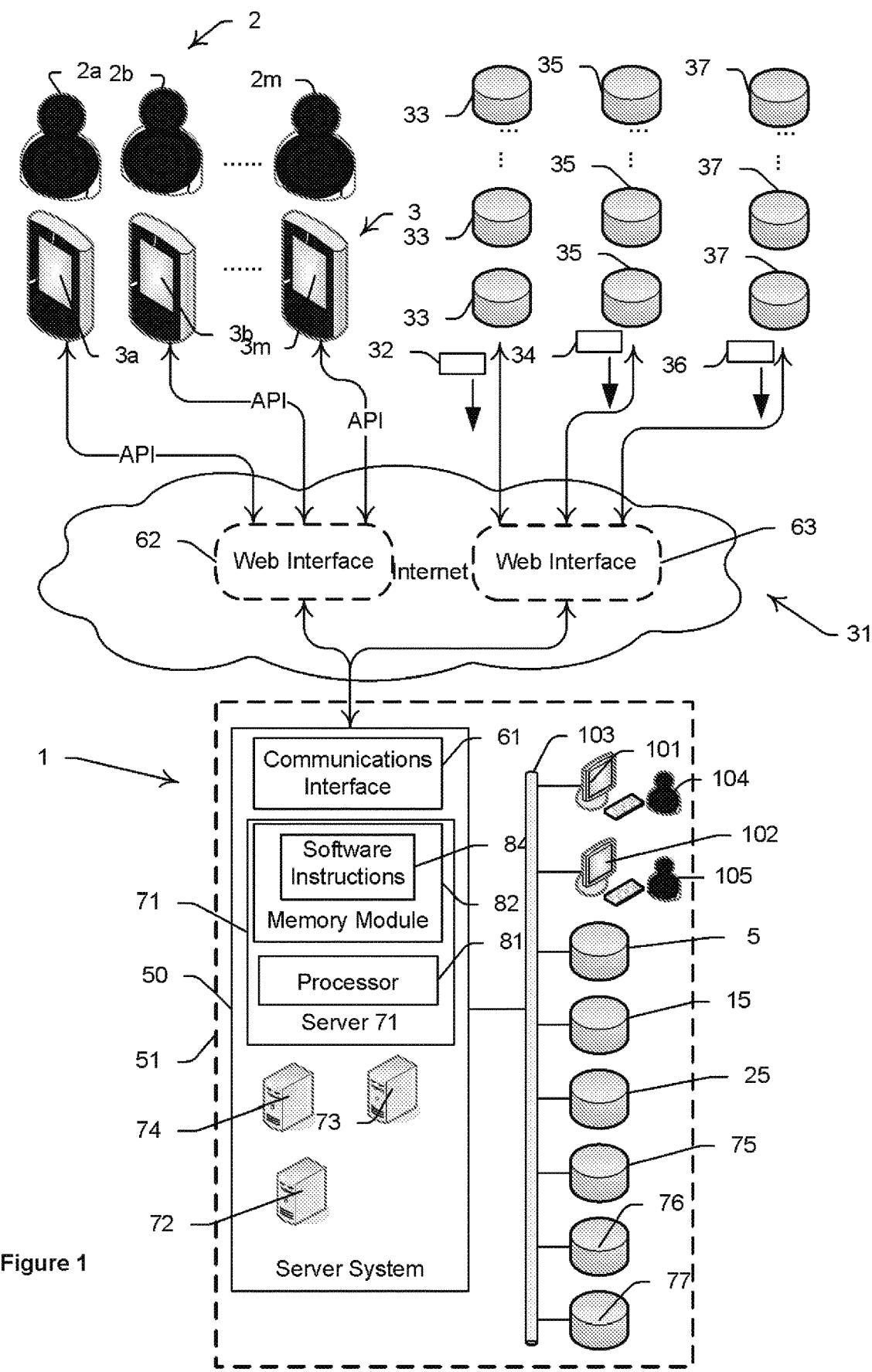
FIG. 1 illustrates schematically a system and method for communicating geographic specific data, exemplified as risk ratings, to a plurality of remote users having respective communications devices.
Figure 2:
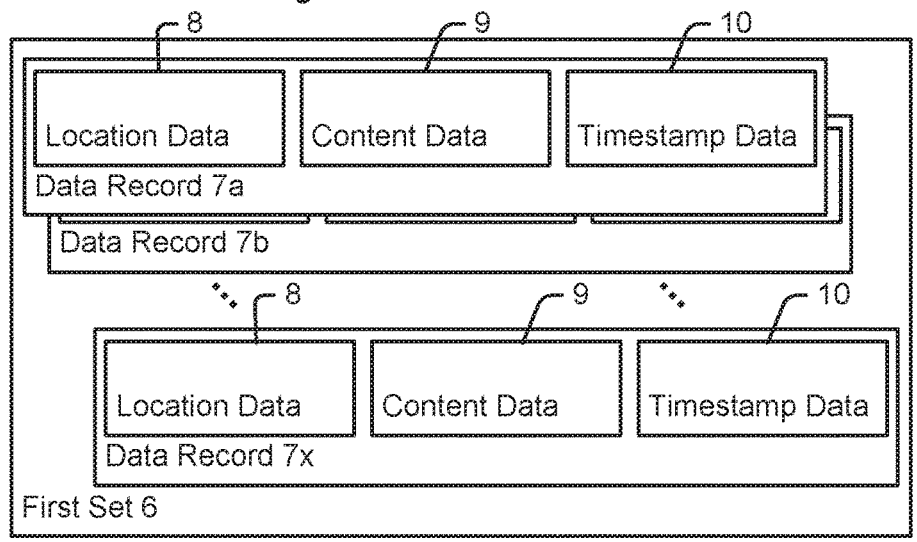
FIG. 2 illustrates schematically the data records in the first set of data records.
Figure 3:
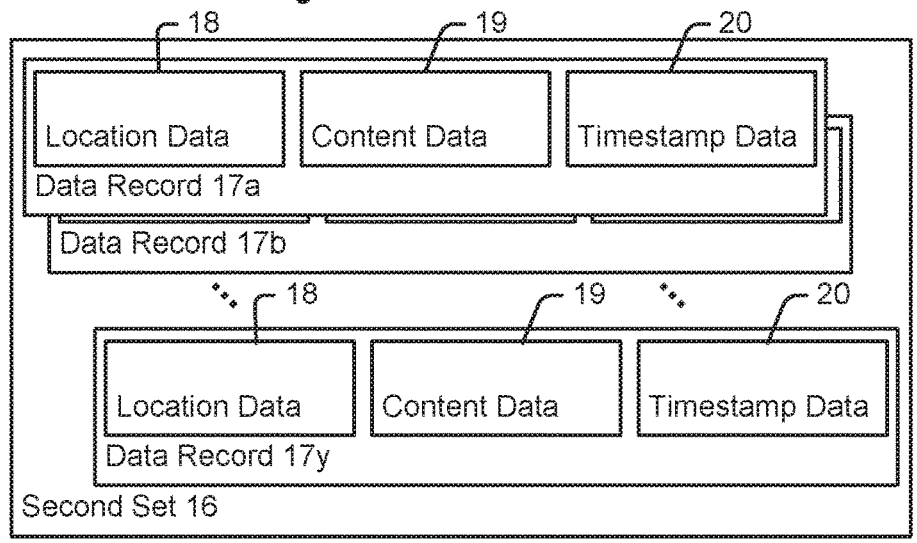
FIG. 3 illustrates schematically the data records in the second set of data records.
Figure 4:
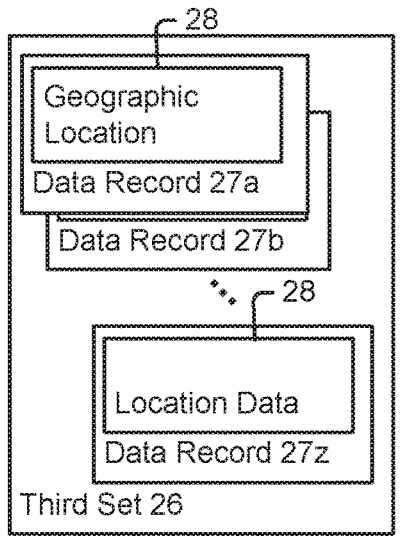
FIG. 4 illustrates schematically the data records in the third set of data records.
Figure 5:
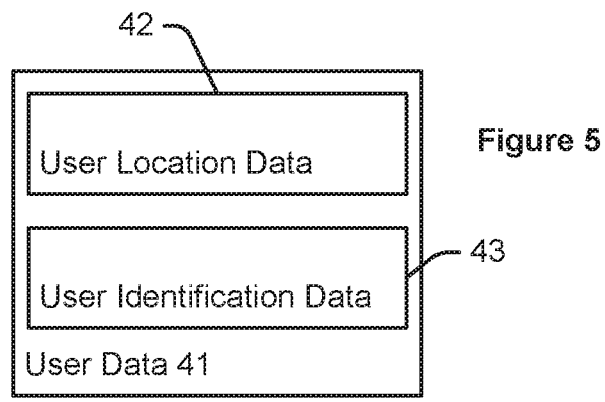
FIG. 5 illustrates schematically the user data obtained by the system of FIG. 1 from the remote user devices.

Referring to FIG. 1 there is illustrated a system 1 for communicating with a plurality of remote users 2 (including but not limited to user 2a, user 2b, . . . , and user 2m) having respective communications devices 3 (including but not limited to device 3a, device 3b, . . . , and device 3m), System 1 includes a first database 5 for storing a first set 6 of data records 7 (including but not limited to record 7a, record 7b, . . . , and record 7x), which are illustrated in FIG. 2, wherein each data record 7 includes location data 8, content data 9 and timestamp data 10, Referring again to FIG. 1, a second database 15 stores a second set 16 of data records 17 (including but not limited to record 17a, record 17b, . . . , and record 7y), which are illustrated in FIG. 3, wherein each data record in the second set includes location data 18, content data 19 and timestamp data 20. Referring again to FIG. 1, a third data base 25 stores a third set 26 of data records 27 (including but not limited to record 27a, record 27b, . . . , and record 27z), which are illustrated in FIG. 4, wherein each data record 27 is indicative of a respective geographic location 28. Referring again to FIG. 1, a first communications interface 31, delivered by the internet, receives unstructured data 32 from one or more of remote data sources 33 and structured data 34 from one or more of remote data sources 35 and semi-structured data 36 from one or more remote data sources 37. Interface 31 also receives from each of devices 3 user data 41 which, as best shown in FIG. 5, includes user location data 42 and user identification data 43.

Figure 6:
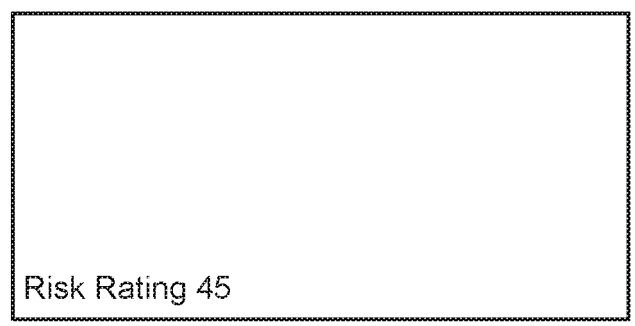
FIG. 6 illustrates schematically a risk rating generated in the system of FIG. 1.
Figure 7:
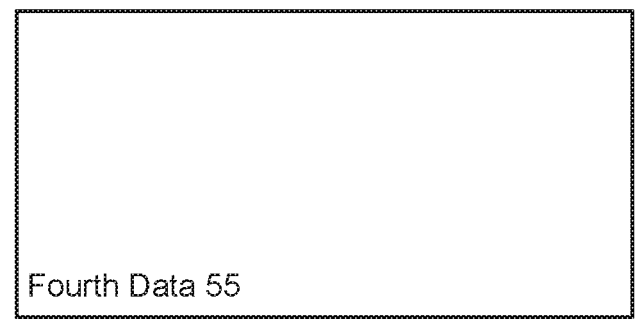
FIG. 7 illustrates schematically the fourth data communicated to each remote electronic device.

System 1 includes a computing platform, in the form of a server system 50, which is illustrated in FIG. 1, that is located in a computing facility 51 and which is responsive to: unstructured data 32 for selectively updating the first set 6 of data records 7; structured data 34 for selectively updating the second set 16 of data records 17; and set 6 and set 16 for generating geographic specific data in the form of a risk rating 45, which is schematically illustrated in FIG. 6, for each geographic location 28 indicated in set 26 of data records 27. Moreover, server system 50 is responsive to the user data 41 and set 26 for selectively generating for each device 3 respective fourth data 55, which is schematically represented in FIG. 7, that is derived from one or more of: selected data records from set 6; selected data records from set 16; and selected geographic specific data in the form of risk ratings 45.

System 1 includes a communications interface 61 for communicating the fourth data 55 to the respective communication devices 3 via interface 31 and more particularly via a web interface 62. Interface 61 also communicates requests for data 32, 34 and 36 from server system 50 to data sources 33, 35 and 37, via interface 31 and more particularly via a further web interface 63. The data 32, 34 and 36 that is gathered is then communicated to server system 50 via the same interfaces 62 and 63. In other embodiments, different or alternative communications and web interfaces are used.

Server system 50 includes a web server 71 for gathering and ingesting data 32, 34 and 36 via interface 61, a data processing server 72 for generating risk ratings 45 (and/or other geographic specific data), and a front-end server 73 for communicating the fourth data to devices 3 via interface 61. Other servers (not shown) perform a variety of operations to allow the operation of system 1. Server system 50 also includes a database 75, referred to as a spatial gazetteer, which includes data records (not shown) that are indicative of geographic locations. These records are able to be anywhere from specific (such as a specific GPS coordinate) or generalised to a region (such as a suburb, city, state, country, geographic feature or any other such intermediate generalisation for a political or geographic region). A further database 76 is used to store the risk factors 45 that are generated, whereas a database 77 is used to store the user data 41.

All of databases 5, 15, 25, and 75 to 77 are, in this embodiment, located at facility 51 and are operated by a first party ("the system operator") that is a corporation providing information analysis and dissemination services for a plurality of third party organisations that collectively employ users 2. The third party organisations are able to be selected, for example, from corporations, government agencies and other entities. In other embodiments one or more of the servers within the server system 50 are located other than at facility 51 and communicate with the other servers via a communications network (not shown). In further embodiments, one or more of the databases are combined together with each other, or segmented and spread across a plurality of distinct databases within facility 51 or elsewhere. In some embodiments, use is made of cloud computing facilities in addition to, or instead of, any one or more of server system 50 and the associated databases.

Devices 3 are typically smart phones with inbuilt GPS functionality—such as, for example, an iOS smart phone such as an iPhone 8, iPhone 6S, or one making use of the Android operating system such as a HTC 10, a Samsung Galaxy S7. However, in other embodiments use, is made of a smart phone running the Windows operating system or other operating system. Other smart phones and similar personal communication and computing devices are also broadly applicable to use with system 1.

In other embodiments, one or more of devices 3 does not include an active or an inbuilt GPS receiver, and use is made of alternative means to obtain user location data. For example, the use of triangulation or cell location is able, in some embodiments, to provide sufficiently accurate user location information. Other options include making use of a separate GPS receiver that in use is carried by the respective user 2.

Preferentially, the devices 3 include at least a 3G network capability and more preferably a 4G network capability, in addition to any WiFi or Bluetooth connectivity. In some embodiments, communications between system 1 and devices 3 occurs selectively in addition or instead by another communications interface than interface 61. An example of the latter includes an SMS interface for urgent alerts where system 1 assesses that no other communication channel is available for a given device 3.

Devices 3 are typically commercially available hardware devices running associated software for allowing web-enabled other network-enabled connection with system 1. It will be appreciated that one or more of devices 3 are able to be substituted by another communications device with like functionality. Examples of such other communications devices include desktop computers, laptop computers, tablet computers, PDAs, netbook computers, mobile computers or other web-enabled devices.

Each of the servers within server system 50 includes various components to allow operation. In FIG. 1, and by way of example only, server 71 is illustrated as including a processor 81 coupled to a memory module 82. In other embodiments distributed resources are used. For example, in one embodiment server 71 includes a plurality of distributed servers having respective storage, processing and communications resources. In another embodiment, server 71 is a virtual server and/or a cloud server and/or a hosted server. Memory module 82 includes software instructions 84, which are executable on processor 81. Server 71 is coupled to databases 5, 15, 25, and 75 to 76. In further embodiments, the databases leverage memory module 82.

In some embodiments one or both of web interfaces 62 and 63 includes an API to allow the relevant data to be transferred between the relevant elements. In other embodiments use is also made of a website in addition to or instead of an API. The term "website" should be read broadly to cover substantially any source of information accessible over the Internet or another communications network (such as WAN, LAN or WLAN) via a browser application running on a client terminal. In some embodiments, a website is a source of information made available by a server and accessible over the Internet by a web-browser application running on a client terminal. The web-browser application downloads code, such as HTML code, from the server. This code is executable through the web-browser on the client terminal for providing a graphical and often interactive representation of the website on the client terminal. By way of the web-browser application, a user of the client terminal is able to navigate between and throughout various web pages provided by the website, and access various functionalities that are provided.

Although some embodiments make use of a website/browser-based implementation, in other preferred embodiments proprietary software methods are implemented. For example, in such embodiments, client terminals such as devices 3 (typically smart phones or the like) maintain software instructions for a computer program product that essentially provides access to a portal via which a framework is accessed (for instance via an iPhone App or the like).

Figure 8:
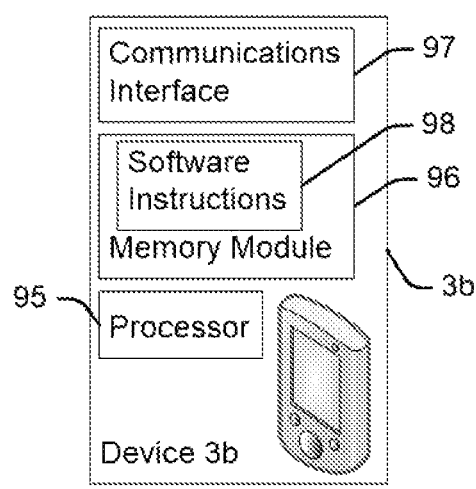
FIG. 8 is a schematic representation of one of the electronic devices of FIG. 1.

In general terms, each client terminal—that is, each of devices 3, be it a smart phone or equivalent or substitute—is able to be schematically represented as shown in FIG. 8. More particularly, and by way of example, in FIG. 8 a client terminal defined by device 3b includes a processor 95 coupled to a memory module 96 and a communications interface 97, such as a wireless 4G connection. In other embodiments, different connections are utilised to gain an internet connection, be it a modem, Ethernet port, serial port, or the like, or a wireless connection other than through a 4G network. Memory module 96 includes software instructions 98, which are executable on processor 95. These software instructions allow device 3b to execute a software application, such as a proprietary application or web browser application and thereby render on-screen a user interface and allow communication with server system 50. This user interface allows for the selective access and viewing of the data stored locally in memory module 96 as a result of receiving the fourth data 55 communicated from server system 50.

System 1 includes a plurality of client terminals, exemplified in FIG. 1 by two administrator terminals 101 and 102. These terminals are located at facility 51 and are connected to server system 50, similarly to the databases, by network bus 103. The terminals are used by respective administrators 104 and 105 to, amongst other things, gain an overview of system 1, generate reports about various operating parameters of system 1, and to manage software and hardware updates and ensure operational continuity and support for system 1.

Reference is made in this specification to "data records" or often just to "records", These terms are used synonymously and describe groupings of data for storage or transmission. A record includes at least one field having informational content and is typically stored in a common database with other records having like fields but different data (or informational content). That is not to imply that the data for a given record need be all stored together or transmitted together, simply that the record, however stored or transmitted, provides an informational whole when required. Moreover, the informational content in a given field is also able to be metadata.

Whilst interfaces 62 and 63 have been illustrated as separate interfaces, in practice these two are often combined as a single interface. For example, a single TCP/IP interface through which all network traffic moves between server system 50 and devices 3, on the one hand, and data sources 33, 35 and 37, on the other.

System 1 is based on an automatic machine-based gathering, ingestion and analysis of data obtained from a variety of sources. To best ensure the use of up-to-date and the most contemporaneous data, particularly in light of the time criticality of the communication with devices 3, primary reliance is placed upon the gathering, ingestion and analysis of unstructured data, preferentially from a large number of different and disparate sources. This form of data is able to be updated or refreshed regularly, and certainly within a time interval that is small compared to the context of the events concerned which subsequently allows high quality communications of alerts to devices 3. The use of this unstructured data is supplemented and complemented with structured and semi-structured data feeds that are typically refreshed—that is, updated—less regularly. The combination of data types is used by the system to automatically develop algorithmic risk ratings for effectively unlimited locations across the globe. It will be appreciated that in the preferred embodiments many tens or hundreds of unstructured data sources 33 are accessed by system 1 between the updating of data records 7 in set 6. Accordingly, to maintain accurate and up-to-date risk ratings, the gathering, ingestion and analysis of the data 32 and the development of risk ratings 45 is automated and machine-based within system 1. The avoidance of any human input in the process of gathering, ingestion, analysis, and communication with devices 3 allows for the risk ratings to be substantially objectively and consistently developed, and communicated to relevant users 2 within a timeframe where the currency of the data is preserved. It will be appreciated that this currency of the data works both in terms of a risk rating increasing or decreasing, which is particularly advantageous.

System 1 makes use of the records stored in database 75 to develop the risk ratings and to maintain a currency for those ratings. These records each indicate a spatial location, be that a geographic point or region (longitude/latitude coordinates or range of coordinates, mountain, river valley, mountain range, etc.), or political location or region (country, state, city, suburb) anywhere across the world. The more accurate the records in the database 75, the more accurate the risk ratings are able to be in terms of the location identified and the estimate of the risk itself. In this embodiment, nesting of locations is done for countries and first order administrative areas only. However, in other embodiments, additional levels of nesting is used to provide finer levels of resolution within a given larger geographic areas. Typically, the finest available level of resolution for a given user's location is obtained, together with any grosser levels (up to the country level) in which the finest available level is contained. In particular, system 1 determines what area or areas the user is in and displays risk ratings and/or associated information about those areas. Taking a specific example, if a user is located in Australia, in the Australian Capital Territory, in the suburb of Acton, system 1 provides to that user the risk for Australia (as a country level location), followed by the risk for the ACT (as a first order administrative area or state) and then a list of risks for nearby point locations. In the present embodiment the term "nearby" is defined by those points within an arbitrary number of kilometres from the user's current location, or in an adjacent area of the same or lower order. This could include the risk for surrounding suburbs such as Barton, Braddon, etc., or to those points within 50 km of the user. It will be also appreciated that system 1 stores each country and first order administrative areas as polygons (area information) and anything else is stored as a centre point coordinate in the relevant polygon. However, in other embodiments a greater number of levels are used as additional geographic resolution is gained. In some embodiments the size of the polygons is determined, at least in part, by user settings on respective devices 3.

Unstructured data is data having content and little or no formal structure beyond that content other than the means for it to be communicated by machine. However, unstructured data is able to have structure, although that structure is typically not anticipated or required in the processing of the content. Accordingly, as used in this specification, the term "unstructured data" includes also within its scope semi-structured data unless the context clearly requires otherwise. Where reference is made in this specification to semi-structured data that is reference to that specific subset of unstructured data. Most unstructured data includes content that is wholly or mostly text data, and is able to be open source or closed source data. Examples of unstructured data (including some semi-structured data) include: text and other data sourced from news publishing websites; text and other data sourced from government advisories; and text and other data sourced from social media, blogs and government or business websites. Unstructured data is also commonly retrieved from the internet by system 1 via RSS feeds to websites of the abovementioned parties, as well as other sources. This unstructured and semi-structured data is automatically mined and stored on a regular basis by system 1. The sources of the data vary over time, typically algorithmically, to continually seek the highest quality data and a statistically significant number of documents with data about any given location. It will be appreciated by those skilled in the art that the quality of the data inputted into system 1 affects the accuracy of the resulting risk analysis and the subsequent generation of the risk ratings. In some embodiments, the level of metadata contained within given data is used as an indicator of how structured that data is. More particularly, unstructured data has almost no metadata, whereas semi-structured has more metadata, and structured data has metadata about every element or substantially every element of the data.

System 1 also makes use of structured data, which typically in the form of statistical information and location based alerts from highly reliable data sources. The data is typically published in a standard and predicable format which allows for ease of processing of updated data as desired content is able to be accurately and easily identified and extracted for subsequent analysis. The structured data 34 used in the embodiments of the invention includes, without limitation, statistical data on indicators of locations risk, such as data on: health (for example, deaths from preventable disease); crime (for example, crimes rates, which are often adjusted to reflect how serious a crime is); and historic data; geopolitical data; government type; political stability etc.

Figure 9:
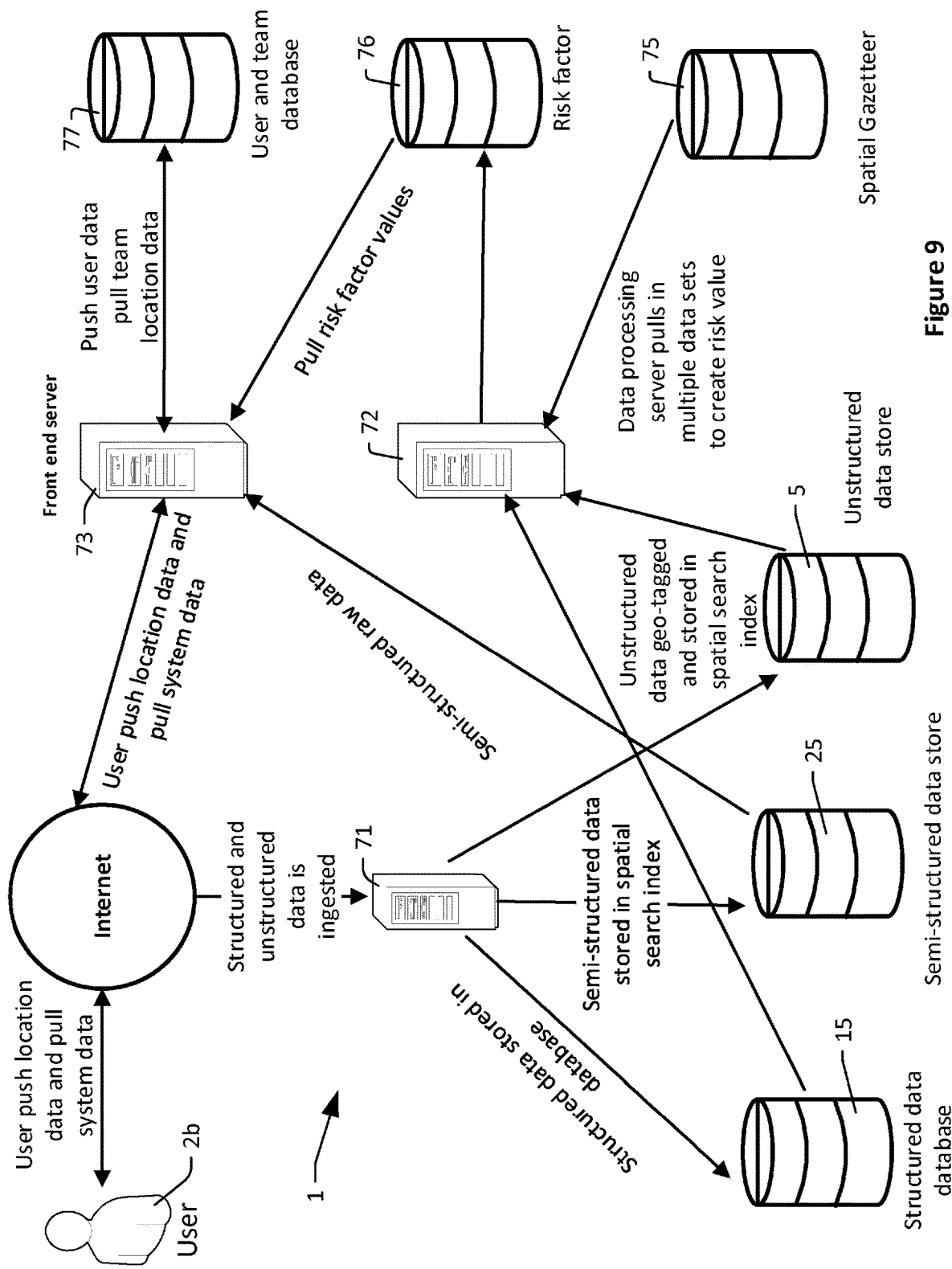
FIG. 9 is a schematic representation of the system of FIG. 1 showing the primary informational and computational flows within that system.

In use, system 1 automatically gathers, ingests and analyses data, utilising structured data and unstructured data (including semi-structured) feeds to best ensure currency. Exemplary data and processing flows, as used in the FIG. 1 embodiment, are illustrated in FIG. 9.

The automated analysis of ingested data by system 1 relies on having at least one physical location assigned to every piece of content data to allow a spatial analysis to occur. To ensure this requirement is met, system 1 first ensures that all data—be that structured or unstructured data—is geo-tagged. In broad terms, that results in data 32, 34 and 36 having the typically text content extracted and stored in databases 5, 15, and 25 respectively together with automatically developed location data for each record. This location data defines metadata that is typically derived from the content data, or from other context such as the nature of the data source from which the content is gathered. The records are also timestamped to allow the subsequent analysis to assess the relevance of the data having regard to temporal currency. The data records stored in databases 5, 15 and 25 are in this embodiment also indexed to allow and facilitate the rapid performance of spatial queries made to those databases.

The ingestion of the unstructured and structured data is scheduled for different sources, which are able to change over time. The scheduling of ingestion of data from unstructured sources is much more regular than for structured sources. Moreover, for some external sources the ingestion is triggered by an alert from that or those sources provided to system 1 that new data is available. An example of this is provided by RSS feeds that are subscribed to by system 1. Other examples include government websites that issue alerts or warnings should there be an event of sufficient significance such as an earthquake, flood or other such natural events. For passive external sources—that is, for sources where system 1 is not able to gain the required feeds or alerts—these are regularly polled by system 1 to assess the availability of and to gather new data. Preferentially the passive sources of unstructured data are polled every hour, and more preferably more than once an hour. However, in other embodiments, different polling schedules are implemented. Moreover, different polling schedules are able to be implemented for different data sources. System 1 is automatically responsive to new unstructured data being available at the external source or gathering and ingesting that new data—including geo-tagging the data—and having set 6 updated to include one or more new records 7. Accordingly, when system 1 next updates the risk ratings it will be automatically responsive also to the newly ingested and stored data.

System 1 is able to poll different sources 33 and 37 at different intervals, either due to being initiated by an alert from the relevant source 33 and 37 respectively, and/or due to a polling schedule (having time-based triggers to undertake a poll) that is maintained by system 1. System 1 is able to adjust the polling schedule and the associated triggers to include the querying of additional sources, or to omit existing sources, or to change the polling intervals between consecutive polling of any of the sources.

Structured data such as statistical data is ingested by system 1 less regularly than the unstructured data. It will be appreciated that structured data, while typically being very detailed, reliable and analytically powerful, often takes considerable time to be published and is published infrequently. For example, detailed population and crime statistics are often published annually, and economic data is often only published quarterly or less. Accordingly, system 1 polls sources 35 less frequently than it polls sources 33 and 37. Moreover, system 1 is able to poll different sources 35 at different intervals, or to adjust the intervals between consecutive polling individual sources 35. Once any new structured data 34 is gathered, it is ingested by way of geo-tagging any extracted content data to ensure that the records 16 in database 15 include location data 18 to link the associated content data 19 to at least one geographic location.

Figure 10:
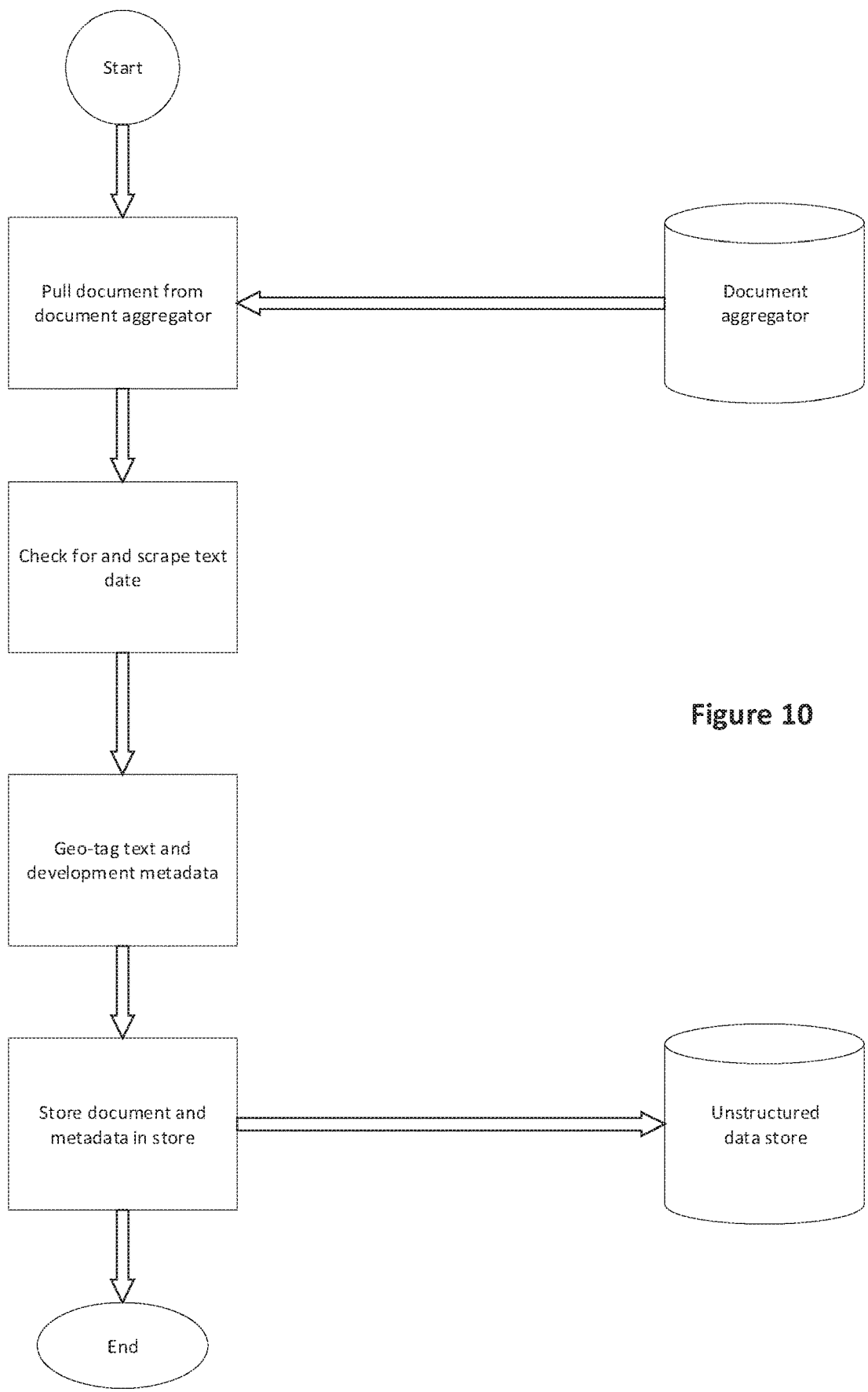
FIG. 10 illustrates schematically the steps taken by the system of FIG. 1 to automatically gather and ingest unstructured data.
Figure 11:
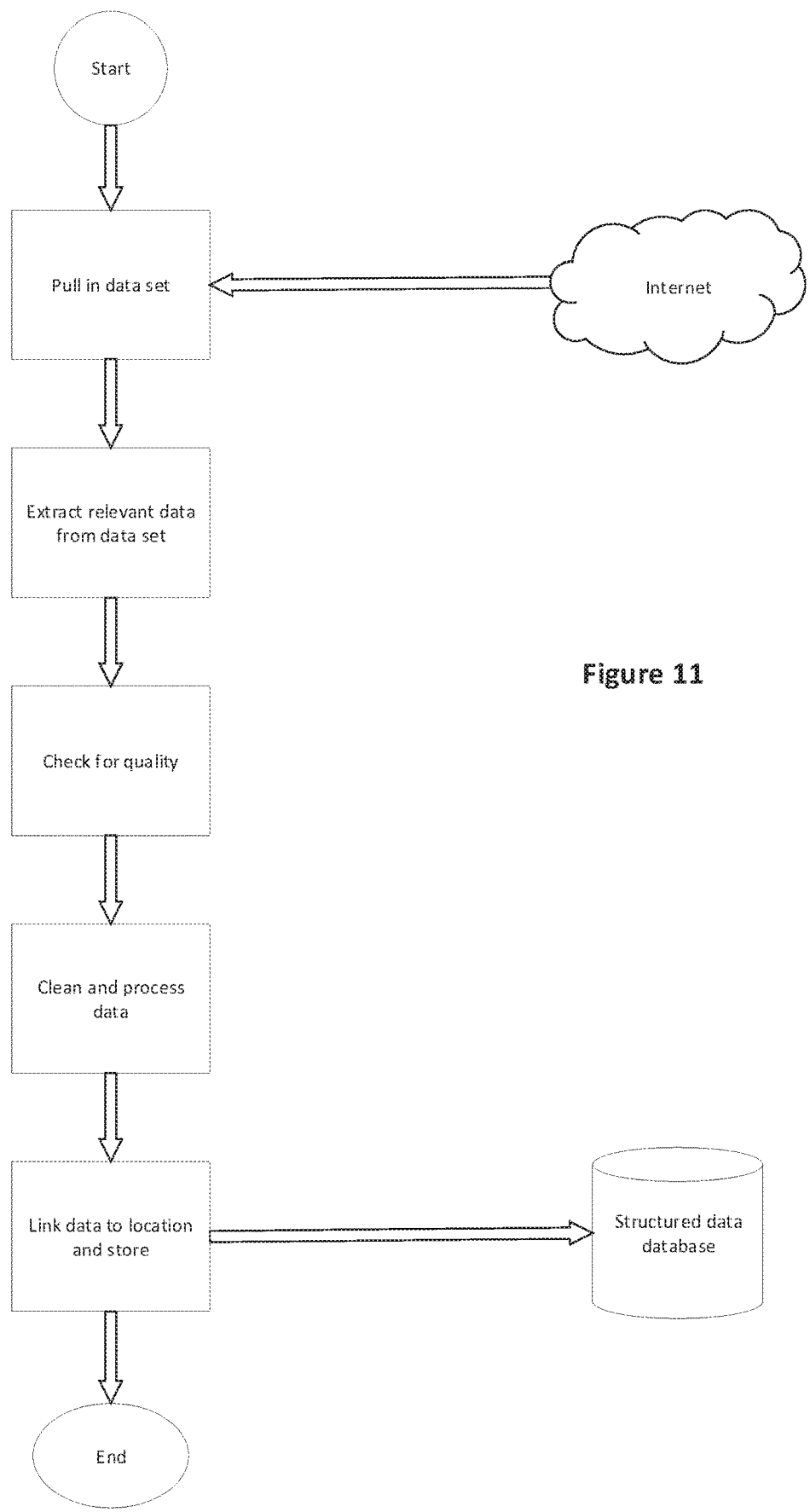
FIG. 11 illustrates schematically the steps taken by the system of FIG. 1 to automatically gather and ingest structured data.
Figure 12:
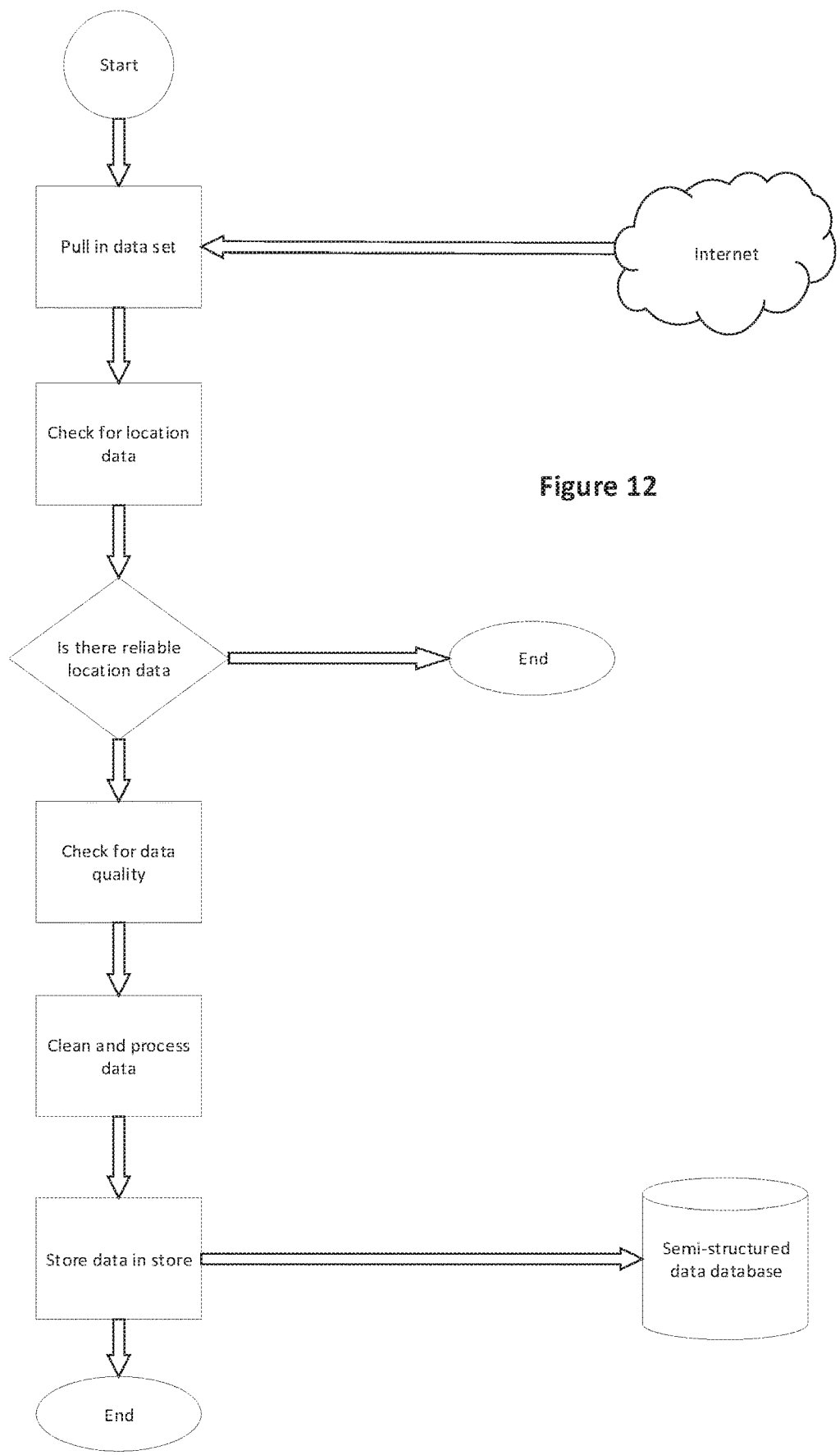
FIG. 12 illustrates schematically the steps taken by the system of FIG. 1 to automatically gather and ingest semi-structured data.

The automated gathering and ingestion of unstructured, structured and semi-structured data is schematically illustrated in FIGS. 10, 11 and 12 respectively.

As shown in FIG. 9, system 1 is responsive to the data ingested into databases 5 and 15 for automatically generating risk ratings for the geographic locations specified in database 75. This generation occurs periodically, and typically at least every hour. For particularly time critical events ingested in the process mentioned above, system 1 is automatically responsive to the new data to recalculate the risk ratings. More preferably, system 1 is responsive to the content data 9 and the location data 8 of any newly ingested record 7 in set 6 for selectively updating the risk ratings for at least those geographic areas associated with the location data 8.

Figure 13:
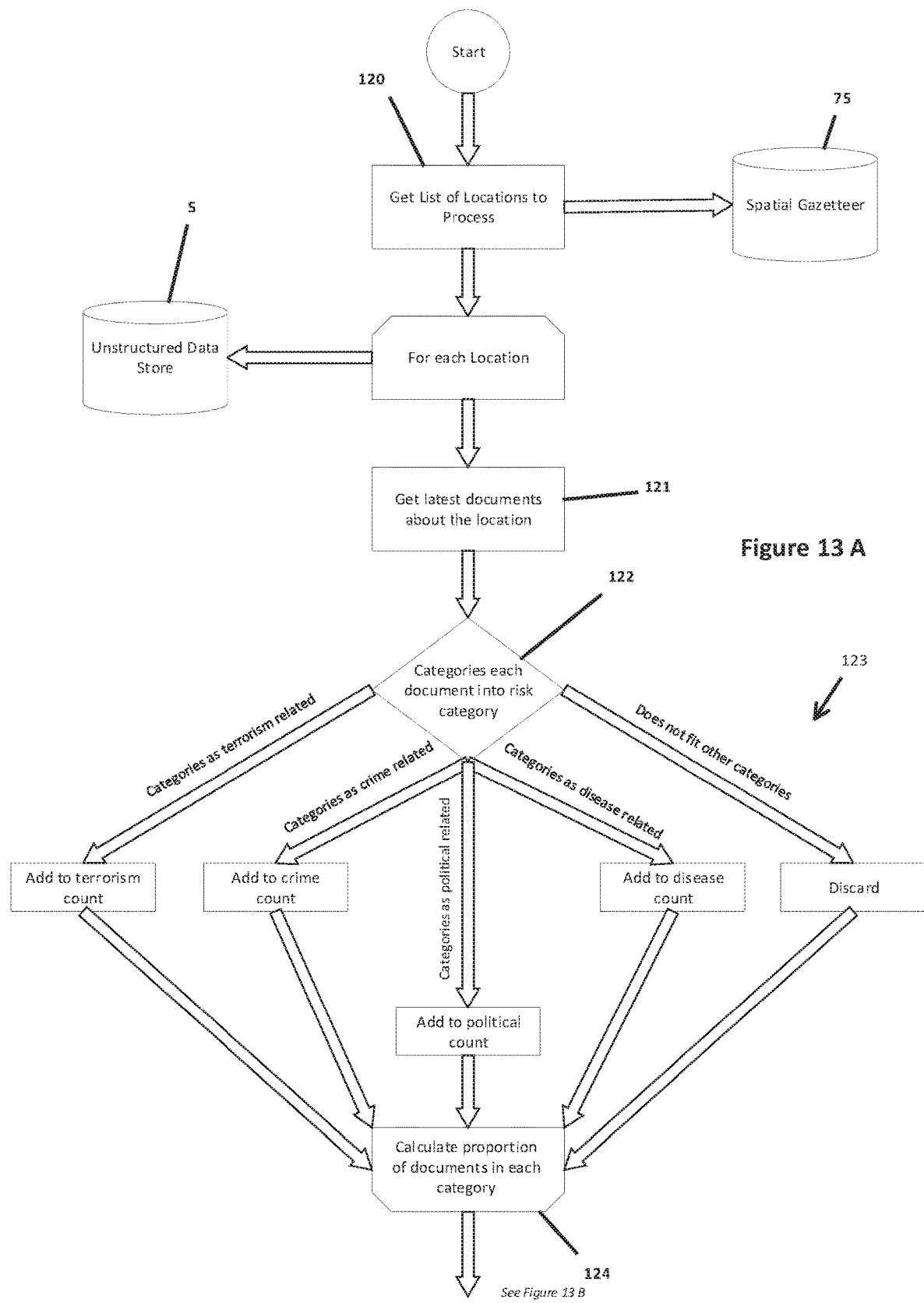
FIG. 13 (which is shown collectively as FIGS. 13A and 13B) illustrates schematically the steps taken by the system of FIG. 1 to automatically generate risk ratings.
Figure 13:
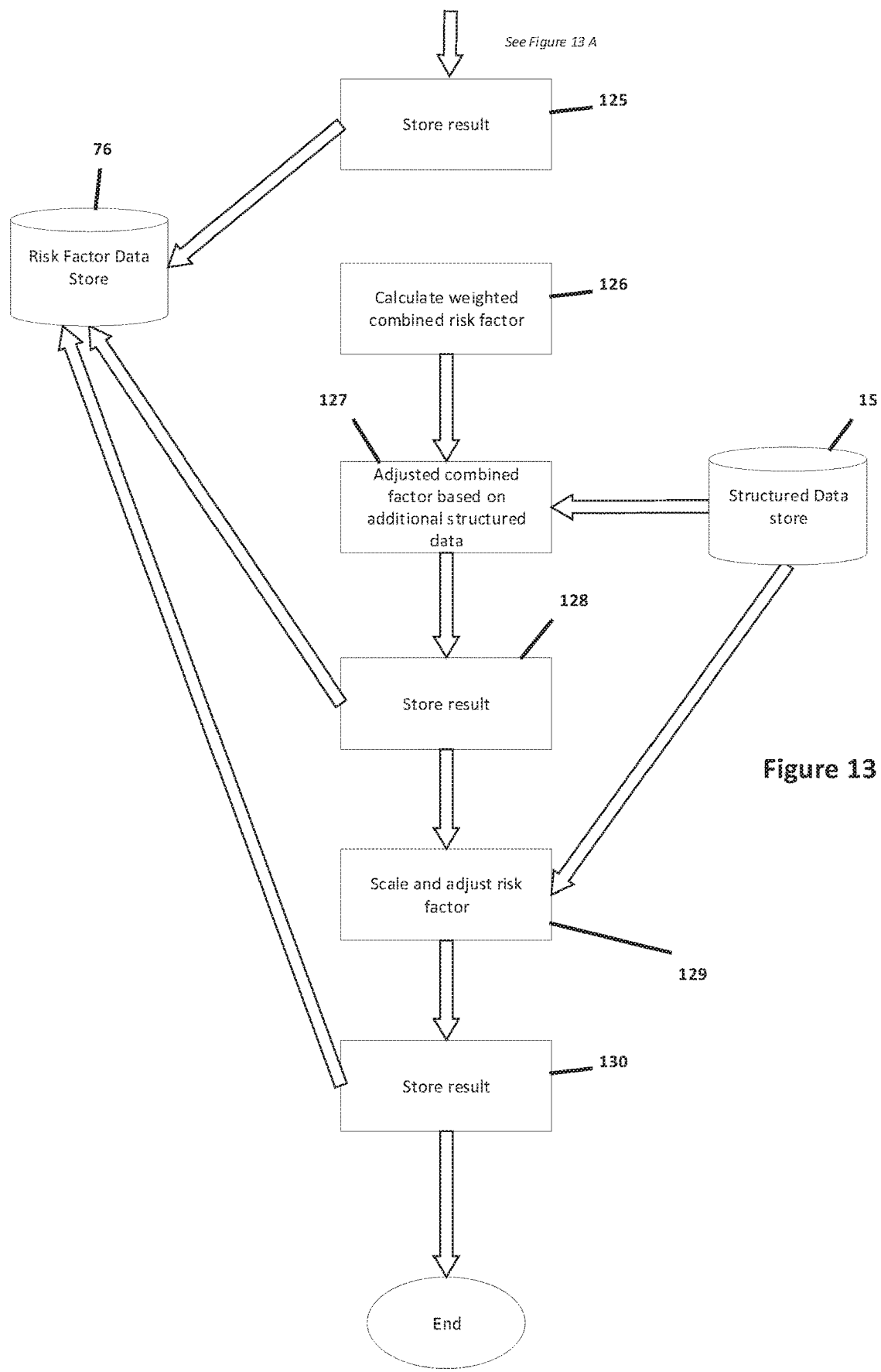

The generation of the risk ratings in this embodiment is a multi-staged automated process and is schematically illustrated in FIG. 13. The initial step 120 involves obtaining a list of locations from database 75. During usual operation, this includes server system 50 querying database 75 to deliver a full list of all locations (that is, all unique location data 28) held within records 27 of set 26. However, as mentioned above, server system 50 is able to limit this query of database 75 to one or more specific geographic locations or areas. For each geographic location returned by the query, server system 50 then retrieves selectively at step 121 the records 7 from set 6. The selection of the records is also automatic and rules-based and is in response to: the location data 8 being assessed in accordance with first predetermined rules to be relevant to location 28 for which the risk rating is being generated; and timestamp data 10 that is assessed in accordance with second predetermined rules to be temporally current and/or not superseded by other more recently gathered data. With all the relevant records 7 identified, server system 50 assesses if the number of identified records is statistically significant. If not, a risk rating will not be generated for that location 28, and server system 50 will progress to step 121 for the next location 28 identified at step 120. The number of documents required to constitute a statistically significant number is contextual and server system 50 is configurable both manually and automatically to adjust the number for any given geographic location. It will be appreciated that increasing the number of records required to satisfy the requirement of being statistically significant typically increases the accuracy of the risk ratings generated for a given geographic location. In some embodiments, the automatic adjustment of the number of documents required is done through use of AI techniques.

If the condition for a statistically significant number of records 7 is met for the geographic location 28, server system 50 executes an algorithm at step 122 that is responsive to the respective content data 9 to classify each record into one or more of a plurality of risk categories. In this embodiment, the risk categories include: terrorism; crime; political; health/disease; and other. In other embodiments, a subset of those risk categories is used, while in further embodiments, different risk categories are used in addition to or instead of the above categories.

The algorithm used by server system 50 at step 122 is a naive Bayes algorithm. In other embodiments use is made of other machine-based classification algorithms, including AI style algorithms.

Once a count of all the documents in each category is established at step 123, server system 50 determines and is responsive to the proportion of records 7 in each risk category at step 124 to generate a risk rating for those categories. As the determination of the risk ratings for the categories relies on the proportion of documents in each category, those ratings are not directly affected by the number of records referenced. These initial risk ratings, once generated at step 124, are stored at step 125 in database 76. In this embodiment, the initial risk ratings are at step 126 used to define a weighted combined risk factor for the geographic location 28. Further, at step 127, the combined risk rating is selectively modified in response to additional base risk data from structured statistical data selected from records 17 stored in database 15. The modified risk rating for the relevant location 28 is at step 128 stored in database 76 for future reference.

The final substantive step in the automatic generation of each risk rating is to scale the combined risk factors to a risk indicator at step 129. In this embodiment use is made of an external and publicly available third party published data such as an index or countries or a country ranking. Example indices and rankings used in different embodiments include: The Democracy Index (compiled by the UK-based Economist Intelligence Unit); the Freedom in the World annual survey (reported by Freedom House); the Global Peace Index published by the Institute for Economics and Peace; the Worldwide Governance Indicators (published by the World Bank); and the Global Terrorism Index published by the Institute for Economics and Peace. In other embodiments, use is made of more than one set of third party data that is combined to provide a hybrid index or ranking for use within the embodiment.

The scaling process at step 129 generates the final risk rating for the geographic location where that final risk rating has an absolute meaning against other risk ratings generated by server system 50. This allows for a meaningful comparison of risk across geographic locations, and between subsequent generations of the risk rating for the same location. The final risk rating is, at step 130, stored in database 76. In summary, system 1 allows for the automated generation of risk ratings for the different geographic locations, based upon the automated gathering, ingestion and analysis of data from a variety of sources. The risk ratings generated all fall within the range of 0 to 1—that is, typically, $0 \leq \text{risk rating} \leq 1$—and, as such, are comparable with other risk ratings, and with the risk rating for the same location but determined at a different time.

The steps of FIG. 13 are carried out for all the required locations 28. In some embodiments, the calculations for each location occurs sequentially, while in other embodiments they occur in a number of parallel processing paths. It will be appreciated that the locations 28 are able to overlap or be contained within another location 28. For example, a geographic location 28 indicated by a first exemplary record 27 is able to be "China", while another location 28 indicated by a second exemplary record 27 is able to be "Pearl River Delta", while another location 28 indicated by a third exemplary record 27 is able to be "Guangzhou".

A summary of the above process, as performed by system 1, is able to be expressed as follows. From a gazetteer of geographic locations, a single location is selected. For that location, a risk rating is able to be generated by using the following steps:

1. A pool of geo-tagged open source data (in particular news articles and the like) is searched to find articles located near to the selected location. The search is configured to return the latest 300 articles to gain a high confidence level. In other embodiments a different minimum number of articles is specified.
2. If less than a predetermined number of articles—which in this embodiment is set at 30 articles—are returned then no risk is generated for that location, since it is deemed not to have sufficient data. If there are more than 30 articles, then the risk rating generation continues.
3. For each of the articles a classification algorithm is used to determine which risk category that articles fall into or if it is not risk related.
4. Once all the articles are classified the percentage of the total returned in each risk category is calculated and the percentage is used as the raw risk level for each risk category.
5. The risk levels are then augmented by structured data in the form of severity adjusted disease and crime statistics.
6. The final category risk levels are then combined into a single number, using weightings to adjust for severity of risk categories.
7. The risk value is then normalised using an outside measure of country stability and risk, resulting in a final number—a risk rating—which is approximately between 0 and 1.

In other embodiments, the normalisation is undertaken to provide a rating within a different range.

It will be appreciated that the number of articles specified in step 1 and 2 is able to be more or less than that mentioned. It will also be appreciated that, in other embodiments, steps 5, 6 and 7 are omitted, or configured differently.

An illustrative example of a risk rating for the state of New South Wales, Australia, is able to be calculated as follows:

1. A search is performed of geo-tagged news for those of the articles which are tagged as being in New South Wales.
2. The search query above returns 300 articles; of which: 67 articles are categorised as crime related; 23 articles are classified as disease related; 9 articles are classified as terrorism related; 13 articles are classified as being related to political unrest; and 188 articles are classified as being unrelated to any risk category. This gives raw risk ratings of:
   67/300=0.22332 crime;
   23/300=0.07667 disease;
   9/300=0.03 terrorism;
   13/300=0.04332 political.
3. For this example, the severity adjusted crime level of New South Wales is 0.02 and disease is 0.001. This gives final risk levels of:
   0.02+0.22332=0.24332 crime;
   0.001+0.07667=0.07767 disease;
   0.03 terrorism; and
   0.04332 political.

4. In this example the normalisation value (average risk value of the places determined as being the least stable or safe in the world using an outside measure) is 0.965. Accordingly; the final normalised risk value is $$\frac{(0.24332 + 0.07767 + 0.03 + 0.04332)}{0.965} = 0.40861$$

(which assumes a weighting of 1 on all categories).

With the final risk ratings for all the specified geographic locations determined, and being regularly updated to ensure currency in practical terms, system 1 is able to interact with devices 3 to provide the fourth data 55 for those respective devices. This will be described further in relation to FIG. 14. To enable this interaction with devices 3, those devices 3 preferentially store and execute local computer code, in the form of an App issued by the operator of system 1. This App affects a number operations, including providing user data 41 to server system 50 via interface 62, and extracting from the fourth data 55 communicated to that device 3 from server system 50 updates to locally held risk ratings and associated content data and rules data. Importantly in this embodiment, the App allows all devices 3 to operate when offline, and to update (that is, to synchronise) with any updates from server system 50 when online access is available. Moreover, when updates occur, the App cooperates with system 1 to only require new information to be communicated to each individual device 3, which further increases the speed of the update and the reliability and currency of the data held locally on each of devices 3. Moreover, the fourth data 55 does not have to include all data, but only that data which is deemed geographically relevant to the user 2 of device 3. This automatically ensures the most up-to-date and relevant risk ratings and other data that is geographically significant to user 2 are uploaded at each online session that is established between device 3 and server system 50. This provides users with a high degree of comfort in the accuracy of the data held locally on devices 3 while also reducing the amount of data that has to be transmitted to a given device 3 to ensure the respective users 2 are well informed of the risks associated with the location they are at.

Figure 14:
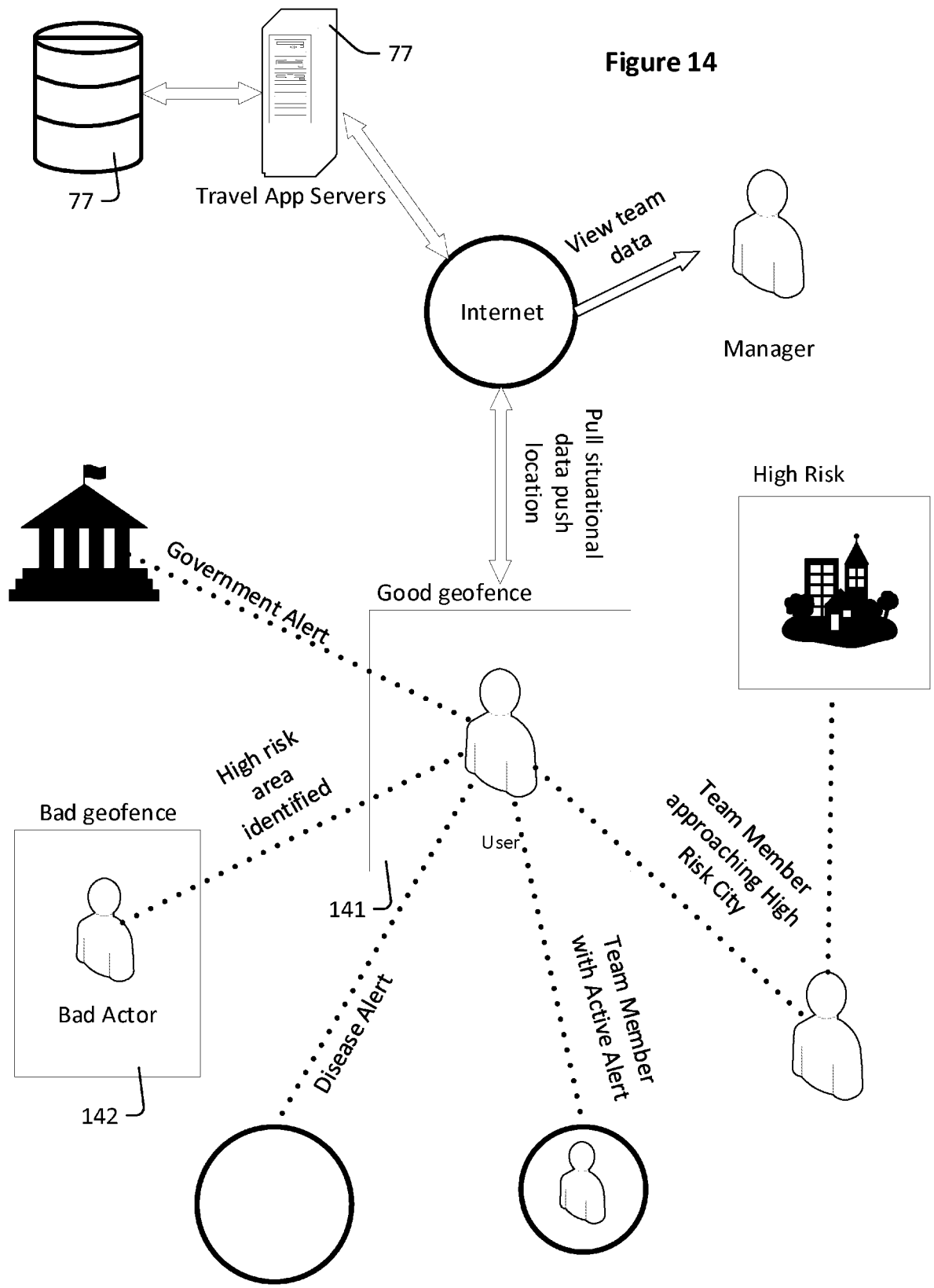
FIG. 14 illustrates schematically the operation of the remote electronic devices that is enabled by the system of FIG. 1.

The user data 41 is pushed by devices 3 to server system 50 and identifies both the individual user, by way of user identification data 43, and the location of the user, by way of user location data 42. This data is extracted by server 73 from the user data 41 to update the records in database 77. The App running on respective devices 3 typically periodically pushes the user data 41 to server system 50. However, the App is also responsive to the geographic movement of the respective user to more regularly or less regularly push the user data 41. For example, if the locally generated location data indicates the user 2 is moving rapidly—for example, when travelling on a fast train—the App is able to obtain automatically more frequent updates not only for the present location but for the anticipated destination and any intermediate location. The App also allows the respective user 2 to define on device 3 one or more geofences. Example geofences, such as a good geofence 141 and a bad geofence 142, are illustrated in FIG. 14.

In other embodiments, the App is responsive to user 2 remaining within geofence 141 to instituting a low frequency push of user data 41 to server system 50. If user 2 approaches the boundary of geofence 141, the App will automatically initiate a push of fresh user data 41 to server system 50. In the case of user 2 approaching, or being within geofence 142, the App will institute high frequency pushes of user data 41 to server system 50.

The fourth data 55 is compiled by server system 50 to synchronise the data held locally on devices 3 with that data determined to be geographically relevant to the respective users. In addition to the final risk ratings, the fourth data 55 selective includes selected raw data, rule sets for displaying the risk ratings and raw data to the individual users 2 of respective devices 3, and other factors relevant to displaying relevant situation relevant information to the end users.

The App executed on devices 3 is preferably map-based and easily navigate-able. It enables the interface of devices 3 to present to users 2 an intuitive and easy to interpret situational picture both on and offline. The locally stored data is reviewed, viewed and cached on devices 3 based on the location, with data stored in a layered format to ensure more relevant data is initially displayed but that other data is able to be displayed, if required. The caching process for individual devices 3 relies on the individual user's location to determine the data to be cached. This not only reduces the need for local storage space on the relevant devices 3, but also reduces the amount of data required to be transferred to maintain an accurate, relevant and current set of risk ratings and associated information.

In this embodiment, the risk ratings within devices 3 (or other web enable devices) are presented in a traffic light approach, using a symbolised green, amber and red colour ramp. A green colour represents a low risk rating, amber a medium risk rating and red a higher risk rating. As the risk ratings are initially calculated to be comparable, this provides the users with a reliable and consistent indication of risk over time and location.

Server system 50 generates rule sets for individual devices 3 and communicates these rules sets, as required, to those individual devices by incorporating the relevant rule sets in the fourth data 55. These rules sets are used to determine and/or control predetermined behaviour of the locally installed App on device 3. For example, a rule set is able to determine which alerts the App generates depending on incoming data and other inputs. One such rule set generates alerts by evaluating an individual user's current location, nearby events, direction of travel and location in regard to "good" or "bad" geo-fenced areas. This process evaluates cached data without requiring connection to the system servers, allowing alerts to be generated offline. This functionality also facilitates the management of any users of a given organisation based upon the individual roles of the users. For example, the rule set for a user who is a government diplomat negotiating an international agreement are able to vary from the rule set for a government driver for the diplomat.

System 1, as embodied, sources different types of data from a large number of public and private data sources, associating the data with a geographic location (geo-tagging) and formatting that data in such a way that further analysis is able to be easily and quickly performed. It enables an automatic situational awareness system based upon structured, semi-structured and unstructured data and machine learning techniques to automatically generate a risk rating associated with locations across the globe. Moreover, use is continually made of newer current data, and more frequently newer current unstructured data, to update and refresh the data upon which the risk ratings are derived. These risk ratings and other content data provide a compact and comparable form of data that is able to be communicated to the relevant remote devices to display situation relevant information to the respective users 2 via a map interface enabled by a mobile App or web based portal.

It should also be appreciated that system 1 is able to generate risk ratings for any set of locations in the world including any one or more of: country; region; city; or arbitrary coordinates or range of coordinates. As mentioned above, any given location is able to overlap or to be contained within one or more other locations.

The identification of the relevant data sources includes server system 50 using geographic search engines to locate relevant keywords from government administered or other official sites related to travel warnings and natural events, news content and social media. The identified travel advice from the multiple government sources, public and open source sites and the like are then imported, geo-tagged and stored for allowing the subsequent generation of the risk ratings and the formulation of the fourth data 55 to be communicated to individual devices 3. The fourth data 55 is able to include specific warning markers to automatically identify the relevant locations concerned where there is a higher risk rating. Moreover, geofencing of those locations is able to be used around those locations to warn the relevant user should he or she approach an area where there a risk rating has been generated.

As noted above, the risk ratings are generated automatically through the application of coding algorithms which designate a risk rating for each location based on unstructured data such as news articles relating to the area. The final risk ratings, presented within a map interface on the remote devices 3, are updated for every location every hour or so in this embodiment. Updates for geographic regions and countries are made when a risk is identified by server system 50 or a risk rating changes. In response to changes in a given risk rating, server system 50 will generate relevant alerts to the relevant users based on the proximity to the risk event. The alerts take the form of server system 50 pushing refreshed fourth data 55 to the relevant devices 3. In this embodiment, the proximity is defined as the distance between the location of device 3—that location being ascertained from the GPS location for the device held in database 77—and the risk location.

In other embodiments the risk ratings are calculated more or less frequently based upon one or more of: the available processing power; the specified needs of those subscribing to the use of system 1; the location of the users; and the nature of the ingested information. For example, if there are no users at or near a given location, system 1 is able to automatically omit a re-generation of the risk rating for that given location until it is determined that a user is intending to seek information about that location, or is assessed as likely to approach that location.

Server system 50 is also responsive to the level of risk and the proximity for generating the alerts. Moreover, server system 50 is able to provide advanced event alerts, such as event alerts with flow on predication. For example, if the risk event is an earthquake, the fourth data 55 communicated to the relevant devices 3 is able to include data about potential aftershocks or tsunamis, or about parties to contact for assistance. Moreover, server system 50 accommodates teams of people and allows for sharing of selected data between the users in the same teams and of any manager. For example, each team member is able to be informed of the location of the other team members and even the risk rating relevant to that other team member. Using a hierarchy within a team, a more senior team member is able to ascertain more detailed information about the team members and the risk ratings and other information. It also is able to allow the more senior member to observe, based upon rules, any unusual team member movement, such as a team member who appears to be flying when he or she should not be.

As mentioned above, the risk ratings in this embodiment are generated about once an hour. Preferentially, however, for all populated areas, countries and first-order administrative divisions which equates to approximately 67,000 locations worldwide the risk ratings are calculated more frequently. In other embodiments, the risk ratings are calculated less frequently.

The risk ratings are generated from a combination of risks derived from classifying news articles and government and open source data about the area in question. The preferred risk categories used in this derivation include disease, crime, terrorism and political risk. The derivation is also influenced by structured data from organisations such as the United Nations on crime rates and data from the World Health Organisation on deaths from preventable diseases. This results in the final risk rating being scaled to between 0 and 1, with 0 being the least risk and 1 the highest risk.

Server system 50 and devices 3, under the influence of the respective locally running Apps, cooperate to communicate individual fourth data 55 to the devices. This allows the individual users to receive tailored and relevant updates and alerts. Particularly advantageous updates and alerts include alerts for the following events:

- If the relevant user approaches a natural disaster—warning distance varies with severity. In some embodiments, use is made of graded rings of 5 km, 10 km, 20 km and 40 km for the least to the most serious disaster. In other embodiments, grades of different quantum or number are used.
- If the user approaches a government advisory zone—warning distance varies with severity of the advisory. In one embodiment, for example, the warning distances are graded with rings of 5 km, 10 km and 20 km between the least and the most serious advisory.
- If the user enters or leaves a predefined geofence. Typically, the geofences are established by the user. However, in some embodiments, geofences defined by one team member is automatically communicated to server system 50 and then disseminated to co-located team members.
- If the user's personal area risk rating increases by a predetermined amount. For example, in one embodiment an alert is provided if the user's personal risk rating increases by 10% or more. In other embodiments, different percentage changes are used, or the changes are assessed over different timeframes. In some embodiments a change threshold is used based upon a selected starting point, such as a 0.1 change in the rating from its lowest point in the last twelve months, or an absolute change from a given point in time, say, since the arrival of the user at the location.

Natural disaster data from reliable websites is crawled by server system 50 every ten minutes and users 2 are warned if they approach a natural disaster zone. The warning distance depends on how severe the disaster is. The default for the present embodiment is for users are warned up to 40 km away for the worst natural disasters. Moreover, in the event of such a disaster, the relevant ones of devices 3 will have designated area or areas highlighted on the map presented in the GUI as a suggestion of a location to where the user may wish to progress. In some embodiments the designated area is a marshalling area for team members, while in other embodiments the designated area is a deemed safe area. In further embodiments, the designated area is selected based upon other criteria or analysis. In some embodiments, server system 50 also communicates to the relevant devices 3 in fourth data 55 route planning data, including route planning between designated sites. This data is preferentially saved locally in the relevant device 3 in cache to conserve battery and data usage for the device.

As foreshadowed above, the instances of the App running on individual devices 3 allows one or more geofences to be set, deleted and changed for each of the users. These geofences are able to be tailored by the user, a manager of the user, or a team leader of the team of which the user is a member, to a small or large area, relevant to the mode of operation of the user, or the mode of transport of the user (for example, whether travelled on foot or by vehicle). This fully implemented geofencing functionality allows the users to set geofences from device 3 or from a separate web interface. It also allows the users to specify the type of each geofence and alert types that are warranted should the boundary of the geofence be approached. The use of geofences also assists in reducing the amount of data required to be included in fourth data 55, or to reduce the frequency with which the fourth data 55 need to be sent. Hence, the bandwidth requirements for devices 3 are able to be reduced, and the ability to reliably operate offline for longer periods enhanced.

The instance of the App installed on devices 3 is designed to operate with limited data updates, and caches almost all data offline on device 3. This results in server system 50 having to communicate in data 55 only the new risk ratings not already contained on device 3. To further this functionality, the users 2 are able to manually download in advance risk ratings for a proposed destination to be available offline. This is particularly useful if the user is not confident that online access will be easily achieved in the proposed destination.

It should also be noted that as the risk ratings and other data are maintained locally at the relevant devices 3, those devices are able, particularly with the use of geofencing, to continue to operate effectively for considerable time in the absence of an internet connection. That is, should a user move to the edge of a geofence when offline, device 3 will be responsive to the location signal provided by the inbuilt GPS receiver and the locally held data (both content data and rules data) to generate an alert to the user even in the absence of an active internet connect at the time.

To complement the above offline functionality, the embodiment above also offers offline base maps to make the App more fully usable while offline.

The above embodiments of the invention provide for a communications device 3b for a user 2b, where the device 3b is able to establish a communications session with the remote computing server system 50 that selectively generates fourth data 55 for the device 3 that is derived from risk ratings 45 for at least one geographic location 28. The device 3b includes a communications interface 97 for receiving the fourth data 55 and for providing user data 41 to server system 50 during the communications session. It will be appreciated that this session is preferably a secure session. Device 3b also includes memory 96 for storing local data (not shown) that is derived from the fourth data 55. A processor 95 executing local computer code 98 for selectively presenting the local data to user 2b. As mentioned above, it is not necessary for the communications session to be active—that is, for device 3b to be online—for device 3b to provide the selective presentation of the local data to user 2b.

As also foreshadowed above, the fourth data is able, in at least some embodiments, to include content data and rule data. In those embodiments the local data is derived from that content data and rule data, and processor 95 is responsive to the rule data in the local data for selectively presenting the content data to user 2b. Typically the content data will be presented to user 2b via a graphical user interface included as part of device 3b. However, it is also possible to present some content data—for example, an alert—through a different user interface, such as a vibratory device (not shown) or an audible signal.

As mentioned above, the App stored and executed locally on devices 3 implements team management processes. In addition to the above description, those processes include an invitation process for allowing the formation of a team and for a new member to join a team. It also includes the ability for users that are members of a team to message other team members and post user information to other team members. An example of such a post is "Car accident at [location X]"). There are also functionalities in the local Apps, and those executed by server system 50, to allow team administrators to set team rules and App actions for team members. These rules allow, for example, team members with the correct permissions to view the locations of other team members. A further functionality includes the ability to generate SOS alerts both on devices 3 and server system 50, which are sent via text message. The locally running Apps are responsive to such text messages for generating an App based alert to nominated people. The SOS alerts are able to be triggered by any user, and a set of people, based on team settings, are then alerted via SMS and/or email. In this embodiment of the invention, the SOS alert message includes the current location of the user and a timestamp of when the alert was triggered.

Server system 50 allows all of the team functions to be overseen and/or managed by a team manager (illustrated in FIG. 14) by way of a web-based management interface.

In addition to the above, the App has the ability to assist individual users 2 to navigate from that user's present location to a designated location while simultaneously avoiding routes involving any events or locations with a designated risk rating.

Significant technical features and functionalities of the above embodiment include those described in the following table.

| Description of significant technical feature | Significance/Effect |
|---|---|
| 1. Automatic machine-based analysis of risk<br>The preferred embodiments of the invention use an automatic machine-based analysis of various data types from various data sources, which generates a risk rating for every location. Preferentially that rating is generated about every half hour and designates a risk rating to each location based on the mined data relating to that location. | The risk ratings generated are objective and do not require the intervention of one or more analysts and/or risk consultants using manual methods for data analysis. |

-continued

| Description of significant technical feature | Significance/Effect |
|---|---|
| This risk allocation process is automatically generated through coding algorithms and is able to be done more or less frequently than set out above. Moreover, the refreshed calculation of the risk rating is able to be done selectively by location, anticipated activity, user location and other factors. | |
| 2. Data caching on remote electronic devices<br>The preferred embodiments of the invention run an App on the remote electronic devices to enable a system of data cache on those devices to both reduce the mobile bandwidth usage and enable enhanced offline access to data for the users of the devices.<br>Data caching enables alerts to be generated locally by the remote electronic devices and communicated to the users regardless of mobile reception.<br>The use of spatial context to develop a 'smart cache' ensures that the cached data on each device 3 is geographically relevant to the user of the specific device rather than simply being generic data. | Allows the remote users to gain the benefit of alerts regardless of the mobile reception. |
| 3. Alerts<br>In real time, the locally running App evaluates a series of rule-based alerts to determine if the respective user is approaching an area of increased risk.<br>The electronic devices provide alerts to the respective users with sound and/or vibration and/or visually via a GUI.<br>The alert feature utilises computer generated real time risk assessment coupled with a distance degradation formula to provide location-based alerts, tailored to the user. | Alerts are targeted based on user's actual current location as opposed to a generalised alert. This minimising the "noise" for users and increases the significance of an alert being generated. |
| 3. Offline Cache Geofencing<br>The preferred embodiments of the invention allow teams of users to develop geofenced geographic areas of interest, which are stored on the central server and cached to the remote electronic devices. The users' location in regard to the geofence is evaluated whether the user is online or not. | This feature assists the users intelligently navigate as well as improve individual and team safety. It is particularly useful in search and rescue operations and crisis response. |
| 4. Team Management<br>Individual users are able to identify themselves as part of a team, which enables location sharing and situational awareness within teams. | This is particularly vital in times of emergency or if a team member activates the alert system. |
| 5. Alert system<br>The alert system of the preferred embodiments enables users to alert designated team contacts in case of an emergency. The alert system preferentially operates both via a data channel and SMS to increase the likelihood of successful delivery. For example, an alert message is able to be sent via email and SMS to designated contacts. The alert message preferentially includes the last known location of the user that initiated the beacon. | This feature is vital in search and rescue and in crisis response. |
| 6. Security and Personal Information Protection<br>Team members are able to choose to appear as an alias on system 1 to better prevent unauthorised team members from cognising the true identity of that user.<br>The link between an individual user's email address and location is also able to be obfuscated to increase security. | Provides protection of users personal information at their election. |

The embodiments of the invention are applicable to many different organisations in many different fields, including:

Insurance businesses: for use by insured international businesses and their staff working/visiting in foreign countries. The preferred embodiments allow for the users and the head office of the insured organisation to better manage the risk of harm to the users, with the intention being to reduce insurance claims (and cost), as well as gaining better data about the behaviour of the insured parties.

Security and health organisations: for use by international businesses and their staff working/visiting in foreign countries. It allows the users and head office to better manage the risk of harm to the users, while enhancing the offering to client businesses.

Oil, mining and gas businesses: for use by international businesses and their staff working/visiting in foreign countries. The users and head office are able to better manage the risk of harm to the users with the added intention of achieving reduced HR costs, reduced legal costs (arising from the duty of care), and reduced insurance premiums.

Non-Government Organisations (NGOs): for use by international "not for profit" enterprises and their staff working/visiting in foreign countries to allow the users and head office to better manage the risk of harm to the users with the intention being to also achieve reduced insurance premiums.

Government: used by these agencies and their staff working/visiting in foreign countries to better manage the risk of harm to the users.

Tourism: for use by travel agencies and their staff working/visiting in foreign countries. The users and head office are able to better manage risk of harm to the users, with the potential for reduced insurance premiums.

Education: for use by universities, schools and other institutions and their staff working/visiting in foreign countries. The users and the head office are able to better manage the risk of harm to the user, with the intention of reducing insurance premiums.

The preferred embodiments of the invention accommodate:

An increase in the number of data sources able to be used to gain information from.

The provision of a reliable and compact form of geographic specific data that is easily updated, any which has a useful life even if the user device is operating offline, The ingestion of non-English language data.

The integration of historical trend analyses.

Event identification, which involves processing to determine from ingested data if an 'event' has occurred and predict the location and severity of such an event.

Machine-based predicative models to determine probable consequences of specified events.

Designated safe areas to be located on the map during emergency situations.

Routine monitoring to determine unexpected user behaviour.

User behaviour based alerts to better ascertain the risk levels of a given user. For example, being sensitive to any sudden increase in speed or altitude of the user, combined with location information, to predict various safety threat scenarios for the user.

The major advantages of provided by one or more of the above embodiments include:

The use of a combination of data sources and data types to provide a robust set of geographically specific risk ratings that have a temporal currency.

The frequent ingestion of unstructured data to maintain efficiently and effectively the temporal currency of the risk ratings.

The less frequent ingestion of structured data to maintain a robust and sound analytical underpinning both to the analysis of all the data and to the subsequent generation of the risk ratings.

The frequent recalculation of the risk ratings to provide practical benefit to the users of the embodiments.

Being responsive to the location of the users for intelligently selecting the risk ratings to be updated.

Intelligently selecting the data to be sent to each user based upon the location of the user.

Maintaining an offline local store of the data communicated to the remote electronic devices to reduce the required time and bandwidth requirements of the locally running App while maintaining currency of locally stored data.

Quickly updating the data held on the remote devices in the event of an increased risk rating that is relevant to the user.

The synchronisation of data locally and on the system, to minimise the amount of data to be transferred as updates occur.

The ability to form teams with selected data sharing between teams.

The ability to generate geofences for individual users or for team members of a team of users.

The generation of objective risk ratings that are directly comparable with each other.

CONCLUSIONS AND INTERPRETATION

It will be appreciated that the disclosure above provides various significant systems and methods for communicating those risk ratings to a plurality of remote users having respective communications devices.

Unless specifically stated otherwise, as apparent from the following discussions, it is appreciated that throughout the specification discussions utilizing terms such as "processing," "computing," "calculating," "determining", analysing" or the like, refer to the action and/or processes of a computer platform (be that defined by a single computer or a computing system), or similar electronic computing device, that manipulate and/or transform data represented as physical, such as electronic, quantities into other data similarly represented as physical quantities.

In a similar manner, the term "processor" may refer to any device or portion of a device that is part of a computer platform that physically processes electronic data, e.g., from registers and/or memory, to transform that electronic data into other electronic data that, e.g., may be stored in registers and/or memory. Moreover, a "computer" or a "computing machine" or a "computing platform" is able to include one or more processors whether co-located or distributed.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical computing platform (also referred to as a processing system) that includes one or more processors. Each processor is able to include one or more of a CPU, a graphics processing unit, and a programmable DSP unit. The processing system further is able to include a memory subsystem including main RAM and/or a static RAM, and/or ROM. A bus subsystem is also able to be included for communicating between the components. The computing platform further is able to be a distributed processing system with processors coupled by a network. If the computing platform requires a display, one or more such displays are able to be included. For example, such displays are able to be liquid crystal displays (LCDs) or cathode ray tube (CRT) displays, or the like. If manual data entry is required, the computer platform also includes an input device such as one or more of an alphanumeric input unit such as a keyboard, a pointing control device such as a mouse, and so forth. The term memory unit, as used herein, if clear from the context and unless explicitly stated otherwise, also encompasses a storage system such as a disk drive unit. The computer platform in some configurations includes a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the specification or the claims describe or define a method which includes several elements, e.g., several steps, no ordering of such elements is implied, unless specifically stated. The software is able to reside in the hard disk, or is able also to reside, completely or at least partially, within the RAM and/or within the processor during execution thereof by the computer platform. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or are able to be connected, e.g., networked to other processors, in a networked deployment, the one or more processors are able to operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, a smart phone, a switch or bridge, or any machine capable of executing a set of instructions (sequential or otherwise) that specify actions to be taken by that machine.

Note that while the diagrams only illustratively show in any given electronic device a single processor and a single memory that carries the computer-readable code, those in the art will understand that many of the components described above are also inherently included but not explicitly shown or described in order not to obscure the inventive aspect. For example, while only a single machine or processor is illustrated, the term "machine" or "processor" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, Figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the terms "coupled" and "connected", when used in the claims, should not be interpreted as being limited to direct connections only. The terms "coupled" and "connected," along with their derivatives, may be used. Thus, the scope of the expression "a device A coupled to a device B" should not be limited to devices or systems wherein an output of device A is directly connected or coupled to an input of device B. It means that there exists a path between an output of A and an input of B which may be a path including other devices or means. "Coupled" or "connected" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the essence of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for automatically generating geographic specific data, the method including the steps of:
   storing a first set of data records in a first database, wherein each data record in the first set includes location data and content data;
   storing a second set of data records in a second database, wherein each data record in the second set includes location data and content data;
   storing a third set of data records in a third data base, wherein each data record in the third set is indicative of a geographic location;
   obtaining unstructured data;
   obtaining structured data;
   being responsive to the unstructured data for selectively updating the first set of data records;
   being responsive to the structured data for selectively updating the second set of data records; and
   being responsive to the first and second sets of data records for generating the geographic specific data for the geographic locations indicated in the third data records.

2. A method according to claim 1 including the step of being responsive to the unstructured data for generating further content data and further corresponding location data and updating the first set of data records with that further data.

3. A method according to claim 2 wherein the further location data is metadata and the method includes the step of automatically deriving the metadata from the further content data.

4. A method according to claim 2 wherein the unstructured data includes text data and the method includes generating content data that includes at least some of the text data.

5. A method according to claim 1 including the step of being responsive to the structured data for generating further content data and further corresponding location data and updating the second set of data records with that further data.

6. A method according to claim 1 including the step of being responsive to a first trigger signal for obtaining the unstructured data.

7. A method according to claim 1 including the step of being responsive to a second trigger signal for obtaining the structured data.

8. A method according to claim 7 wherein the first trigger signal issues more frequently than the second trigger signal.

9. A method according to claim 6 wherein the first trigger signal issues periodically.

10. A method according to claim 6 wherein the first trigger signal issues intermittently.

11. A method according to claim 6 wherein the first trigger signal issues within a predetermined time interval since the issue of the immediately preceding first trigger signal.

12. A method according to claim 11 wherein the predetermined time interval is one of: one day; one hour; half an hour; one quarter of an hour; ten minutes;
   and five minutes.

13. A method according to claim 1 wherein there are a plurality of remote users having respective electronic devices and the method includes the further step of being responsive to user location data respectively received from the plurality of remote electronic devices for generating respective fourth data derived from the first and the second set of data records.

14. A method according to claim 13 including the step of communicating the fourth data to the respective electronic devices.

15. A method according to claim 14 wherein each electronic device includes memory for selectively storing local data derived from the fourth data received by that device, and the step of generating the fourth data includes generating intermediate data derived from the first and the second set of data records and generating the fourth data that will allow synchronisation of the local data with the intermediate data.

16. A method according to claim 13 including the step of being responsive to user identification data respectively received from the plurality of remote electronic devices for generating the respective fourth data derived from the first and the second set of data records.

17. A method according to claim 16 wherein the step of being responsive to the user identification data includes generating the fourth data for at least one user to include at least part of the fourth data for another of the users.

* * * * *